US012664139B2

(12) United States Patent　(10) Patent No.:　US 12,664,139 B2
Chen et al.　(45) Date of Patent:　Jun. 23, 2026

(54) REDUCED LATENCY DATABASE FEATURING CONTENTION RISK DETERMINATION

(71) Applicant: INTERNATIONAL BUSINESS MACHINES CORPORATION, Armonk, NY (US)

(72) Inventors: Xiao Xiao Chen, Beijing (CN); Sheng Yan Sun, Beijing (CN); Peng Hui Jiang, Beijing (CN); Bing Jiang Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/496,768

(22) Filed: Oct. 27, 2023

(65) Prior Publication Data

US 2025/0139070 A1　May 1, 2025

(51) Int. Cl.
*G06F 16/22*　(2019.01)
*G06F 16/23*　(2019.01)
*G06F 16/242*　(2019.01)

(52) U.S. Cl.
CPC .......... *G06F 16/22* (2019.01); *G06F 16/2336* (2019.01); *G06F 16/2358* (2019.01); *G06F 16/2365* (2019.01); *G06F 16/2433* (2019.01)

(58) Field of Classification Search
CPC .. G06F 16/22; G06F 16/2336; G06F 16/2358; G06F 16/2365; G06F 16/2433
See application file for complete search history.

(56) References Cited

U.S. PATENT DOCUMENTS

| | | | | |
|---|---|---|---|---|
| 6,484,172 B1 * | 11/2002 | Lee | .................... | G06F 16/2343 |
| 9,009,101 B2 * | 4/2015 | Bhatt | .................. | G06F 16/2358 |
| | | | | 707/609 |
| 9,235,628 B2 * | 1/2016 | Johnson | ............ | G06F 16/24573 |
| 9,672,265 B2 * | 6/2017 | Meran | ................. | G06F 16/2365 |
| 10,922,296 B2 * | 2/2021 | Gurajada | ............... | G06F 16/22 |
| 11,847,121 B2 * | 12/2023 | Zilio | ................... | G06F 16/2456 |

(Continued)

FOREIGN PATENT DOCUMENTS

| | | | | | |
|---|---|---|---|---|---|
| CN | 104714999 A | * | 6/2015 | ......... | G06F 16/2365 |
| CN | 106529304 B | * | 6/2019 | .......... | G06F 21/577 |

(Continued)

*Primary Examiner* — Neveen Abel Jalil
*Assistant Examiner* — Hubert Cheung
(74) *Attorney, Agent, or Firm* — Lily Neff, Esq.; Heslin Rothenberg Farley & Mesiti P.C.; George S. Blasiak, Esq.

(57)　ABSTRACT

Methods, computer program products, and systems are presented. The method computer program products, and systems can include, for instance: generating database logging data of a database, wherein the database includes a certain leaf page associated to a certain row interval; examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure external to the certain leaf page.

19 Claims, 12 Drawing Sheets

(56)                   References Cited

U.S. PATENT DOCUMENTS

| | | | |
|---|---|---|---|
| 2015/0220372 A1* | 8/2015 | Ban ..................... | G06F 9/3834 |
| | | | 710/200 |
| 2016/0275150 A1* | 9/2016 | Bournonnais .......... | G06F 16/25 |
| 2017/0116246 A1 | 4/2017 | Fang et al. | |
| 2018/0067974 A1 | 3/2018 | Fang et al. | |
| 2018/0253467 A1* | 9/2018 | Gurajada ........... | G06F 11/1471 |
| 2018/0253468 A1* | 9/2018 | Gurajada ........... | G06F 16/2255 |
| 2019/0208014 A1* | 7/2019 | Goldberg ........... | G06F 12/1466 |
| 2019/0362001 A1* | 11/2019 | Thallam Kodandaramaih ........... | |
| | | | G06F 16/2358 |
| 2020/0364211 A1* | 11/2020 | Li ....................... | G06F 16/2272 |
| 2021/0026824 A1* | 1/2021 | Wang ................. | G06F 16/2246 |
| 2021/0357419 A1* | 11/2021 | Li ....................... | G06F 16/9024 |
| 2023/0107482 A1* | 4/2023 | Wang ................. | G06F 16/2272 |
| | | | 707/704 |
| 2023/0195710 A1* | 6/2023 | Wang ................. | G06F 16/2272 |
| | | | 707/741 |

FOREIGN PATENT DOCUMENTS

| | | | | |
|---|---|---|---|---|
| JP | 2020003929 A * | 1/2020 | ......... | G06F 12/0661 |
| WO | WO-2023029592 A1 * | 3/2023 | ....... | G06F 16/24553 |
| WO | WO-2023105373 A1 * | 6/2023 | ............. | G06F 16/27 |

* cited by examiner

REDUCED LATENCY DATABASE FEATURING CONTENTION RISK DETERMINATION

BACKGROUND

Embodiments herein relate to databases generally and specifically to a database featuring reduced latency.

The present disclosure relates to databases and particularly to operations for databases. Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table. Structured Query Language (SQL) is a domain specific language used in programming data management in a Database Management System (DBMS). SQL statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table. A Database index is a database data structure that can be used for improving performance of database operations, such as the aforementioned INSERT, UPDATE, SELECT, and DELETE operations that can be performed with use of SQL statements. A database table index can be characterized by a hierarchical structure having leaf pages at a lowest level referred to as a leaf page level, intermediary (non leaf) pages at one or more intermediary level of hierarchy and a highest level of hierarchy consisting of a root page.

Data structures have been employed for improving operation of a computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: generating database logging data of a database, wherein the database includes a certain leaf page associated to a certain row interval; examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure external to the certain leaf page.

In another aspect, a computer program product can be provided. The computer program product can include a computer readable storage medium readable by one or more processing circuit and storing instructions for execution by one or more processor for performing a method. The method can include, for example: generating database logging data of a database, wherein the database includes a certain leaf page associated to a certain row interval; examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure external to the certain leaf page.

In a further aspect, a system can be provided. The system can include, for example a memory. In addition, the system can include one or more processor in communication with the memory. Further, the system can include program instructions executable by the one or more processor via the memory to perform a method. The method can include, for example: generating database logging data of a database, wherein the database includes a certain leaf page associated to a certain row interval; examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure external to the certain leaf page.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
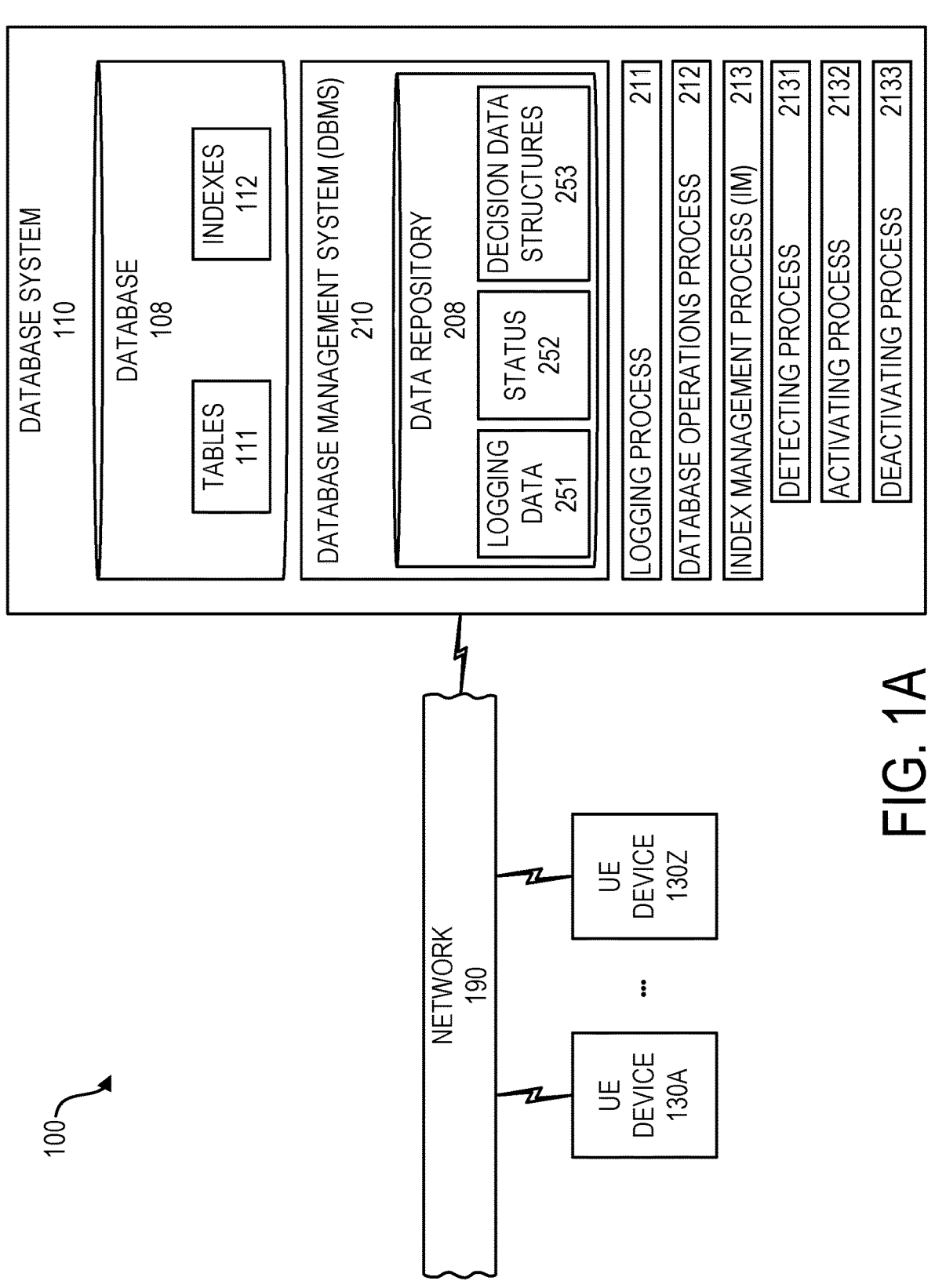
FIG. 1A depicts a system including a database system and plurality of user equipment (UE) devices according to one embodiment.

System 100 for use in reducing response latency in databases is set forth in one embodiment in FIG. 1A. System 100, according to one embodiment, can include database system 110 and user equipment (UE) devices 130A-130Z. Database system 110 and UE devices 130A-130Z can be provided by computing node based devices and systems and can be in communication with one another via network 190, according to one embodiment. Network 190 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

According to one embodiment, each of database system 110 and instances of UE devices 130A-130Z can be external to one another, e.g., located on different computing nodes, e.g., different physical computing nodes. According to one embodiment, database system 110 and instances of UE devices 130A-130Z can be collocated with one another. In the context of UE devices 130A-130Z, the character "Z" can refer to any number of UE devices.

According to one embodiment, database system 110 can be provided by a Structured Query Language (SQL) database system that is able to respond to SQL based query statements. In the course of use of system 100, database system 110 can receive queries from one or more UE devices 130A-130Z. Queries received by database system 110 can take the form of query statements such as SQL statements. Database system 110 can include database 108 and database management system (DBMS) 210. Database 108 can include tables 111 and indexes 112. Tables 111 can logically organize data into columns and rows of data. A row of data within a table can define a record. Each table of tables 111 can have associated thereto zero or more indexes of indexes 112.

A database table index refers to a data structure that can improve the speed of database operations such as database INSERT, UPDATE, SELECT, and DELETE operations. A database table index can be represented by a tree diagram and can be characterized by a lowest level referred to as a leaf page level, one or more intermediate level, and a highest level referred to as a root page level consisting of a root page.

DBMS 210 can run various processes such as logging process 211, database operations process 212, and an index management process 213. Index management process 213 can define an index manager (IM).

Embodiments herein recognize that in database management systems, multiple processes can be in contention with one another. Contention refers to multiple processes or instances competing for access to the same index or data block at the same time. In one aspect, lock contention happens when multiple processes are trying to access the same data at the same time in a database. In the context of an SQL database, contention can refer to multiple transactions trying to access common data at a common time. In one aspect, DBMS 210 can be configured so that transactions are processed independently from one another until they are committed. In one aspect, DBMS 210 can be configured so that a database record (row) is locked at the beginning of a transaction processing and will not unlock and allow modification or access from other transactions until that first transaction either commits or abandons. Such control can be referred to as a row lock. DBMS 210 can perform locks so that multiple transactions are not trying to change the same row of data, for example, at the same time. Such processing ensures correctness and consistency so that, e.g., retrieval of erroneous data can be avoided. Additionally, or alternatively to performing row locks, DBMS 210 can perform page locks.

However, embodiments herein recognize that the described locking can lead to processing delays, e.g., if multiple transactions are trying to access the same locked data at the same time. Embodiments herein recognize that a lock resulting from receipt of an INSERT query can lead to particularly significant processing delays when the INSERT query references a pre-existing row. In such a situation, DBMS 210 can perform an UPDATE operation in response to receipt of an INSERT query, which UPDATE operation can be expected to involve, for changing of row data, the time-consuming action of deleting the old data of the existing row prior to storing of new data to the pre-existing row.

DBMS 210 in data repository 208 can store various data. In logging data area 251, data repository 208 can store logging data, e.g., by DBMS 210 running logging process 211. Logging data stored in data repository 208 can include, e.g., transaction history logging data and index change logging data. Transaction history logging data can include such data as types of queries received, timestamps specifying the time of receipt of such queries, UE device address data associated to received transaction data and the like.

In status area 252, data repository 208 can store the status of each leaf page defining an index such as a column index. The status of a given leaf page can include, e.g., the status of contention risk condition "present", or alternatively, the status of contention risk condition "not present". In decision data structures area 253, data repository 208 of DBMS 210 can store decision data structures for use in returning action decisions. At a given time each leaf page can be associated to a certain row interval.

Data repository 208 of DBMS 210 can store data for use in performing control processes by DBMS 210 including index management process 213 as set forth herein. Data repository 208 in status area 252 can store data specifying a risk status associated to each respective row interval of the column index, wherein each respective row interval of a column index is associated to and maps to a certain leaf page of leaf pages 2130 explained with reference to FIG. 1B. Statuses as set forth herein can include a contention risk condition "present" status and a contention risk condition "not present" status. Data repository 208 in decision data structures area 253 can store, e.g., decision tables, decision trees and other data structures for use in returning action decisions of DBMS 210.

DBMS 210 running logging process 211 can generate logging data, which logging data can include transaction logging data, which transaction logging data can specify a history of actions executed by a DBMS 210 including receipts of query operation triggering query statements by DBMS 210 and performance of query statement operations by DBMS 210. DBMS 210 running logging process 211 can generate logging data in the form of trace event logging data. DBMS 210 can generate index action logging data based on transaction logging data of received queries. Logging data can include data returned from status commands such as a Database Console Command (DBCC) command. One command that can be used to generate logging data in SQL is the DBCC PAGE command which can return data on indexes and pages created by DBMS 210. Logging data generated by the logging process 211 can include, e.g., transaction history logging data and index change logging data. Transaction history logging data can include such data as data that specifies types of queries received, timestamps specifying the time of receipt of such queries, performance of query statement operations, UE device address data associated to received transaction data and the like.

DBMS 210 running database operations process 212 can include DBMS 210 executing database operations, such as INSERT, UPDATE, SELECT, and DELETE operations. DBMS 210 can perform an UPDATE operation when receiving an INSERT query for a row that already exists within a table. When performing an UPDATE operation, DBMS 210 can change data within a row. When changing data within a row, DBMS 210 can delete existing data of the row prior to storing new data to the row.

DBMS 210 running index management process 213 can generate new indexes for tables so that each table of database system 110 has associated thereto zero or more indexes. Indexes associated with tables can improve the performance of operation with respect to such tables, e.g., can reduce the time required for responding to a query operation. DBMS 210 running index management process 213 can include DBMS 210 generating new indexes for tables and, e.g., new leaf pages for indexes. DBMS 210 can generate zero or more indexes per table. DBMS 210 running index management process 213 can include DBMS 210 examining incoming INSERT query statement data queries and based on a determination that a current leaf page has insufficient free space to store a new record, can execute an index split operation. An index split operation can include, e.g., allocating a leaf page from a page store, linking related pages to the leaf pages, and copying data from the current leaf page to the newly allocated leaf page. Index management process 213 can define an index manager (IM).

An index can be defined for a column of a table. The column for which a table index is defined can be referred to as a key column (key) for the index and the values of the column can be referred to as column values (key values). When an index is defined, index manager (IM) can create leaf pages for storage of records of the table. The pages can be ordered in accordance with an order of column values (key values) of the column for which the index is defined. That is, for the column "city" records for cities beginning with the letter "T" can be associated to leaf pages ordered after leaf pages associated to cities beginning with the letter "S". For the column "transaction ID", records for transaction IDs beginning with "002" can be associated to leaf pages ordered after leaf pages associated to transaction IDs beginning with "001". Leaf pages can be assigned unique addresses defining their order.

Figure 1B:
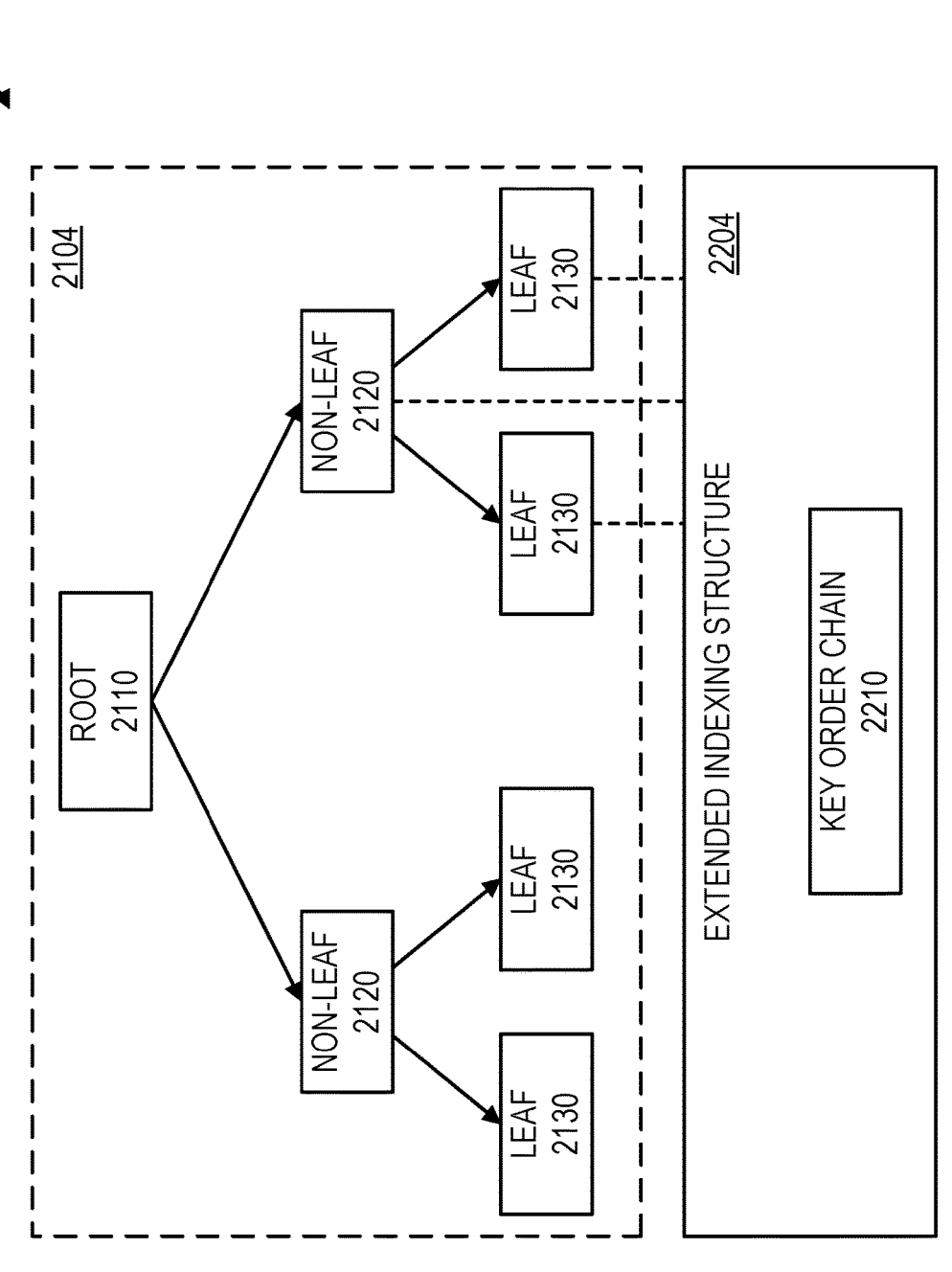
FIG. 1B depicts an index architecture according to one embodiment.

FIG. 1B illustrates index architecture 2102 for an index, e.g., column index according to embodiments set forth herein. Index architecture 2102 can include baseline indexing structure 2104 and extended indexing structure 2204. Baseline indexing structure 2104 can include root page 2110, a plurality of non-leaf pages 2120 and leaf pages 2130. Extended indexing structure 2204 can include one or more key order chain 2210 associated to a certain row interval mapping to a certain leaf page of leaf pages 2130. Extended indexing structure 2204 can be in communication with baseline indexing structure 2104.

In one aspect, DBMS 210 can monitor for the presence of contention risk condition in respect to a row interval associated to and mapping to a certain leaf page of leaf pages 2130. When DBMS 210 detects a contention risk condition for a certain row interval mapping to a certain leaf page of leaf pages 2130, DBMS 210 can activate extended indexing structure 2204 for the certain row interval.

Figure 2:
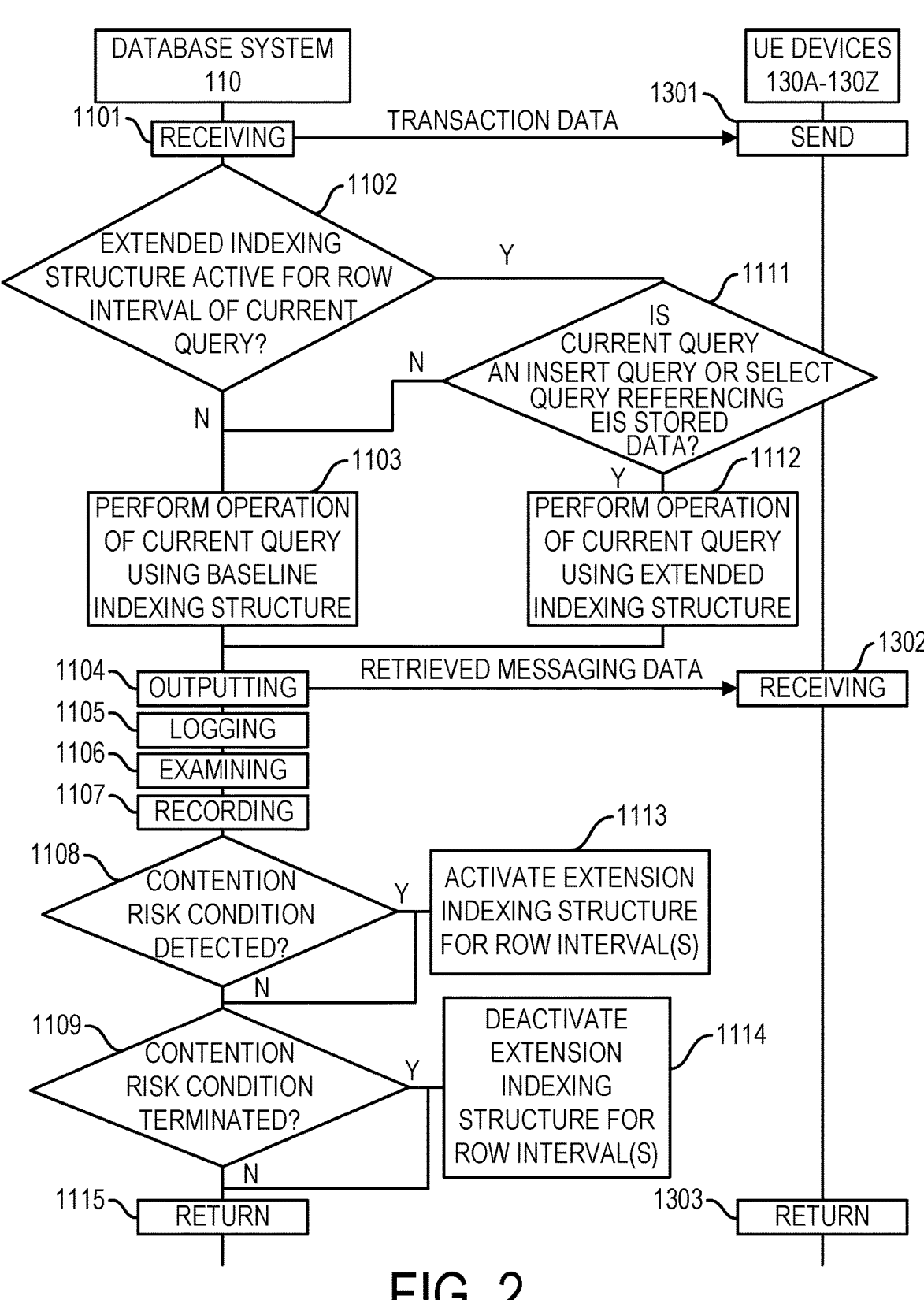
FIG. 2 is a flowchart illustrating a method for performance by a database system interoperating with UE devices according to one embodiment.

DBMS 210 for activating extended indexing structure 2204 for the certain row interval can reconfigure indexing data of one or more non-leaf page 2120 of baseline indexing structure 2104 to specify that subsequent INSERT query statements triggering INSERT operations received, e.g., at receiving block 1101 explained in the reference to the flowchart of FIG. 2 (for a time that contention risk condition persists for the certain row interval) are to be performed using extended indexing structure 2204. With indexing data of the one or more non-leaf page reconfigured as described, DBMS 210, for a time that the detected contention risk condition persists, can perform INSERT database query operations using extended indexing structure 2204 rather than leaf pages 2130 of baseline indexing structure 2104. In another aspect, with indexing data of the one or more non-leaf page reconfigured as described, DBMS 210, for a time that the detected contention risk condition persists for the certain row interval, can perform SELECT database query operations using extended indexing structure 2204 where incoming received SELECT queries reference table data that has been stored to extended indexing structure 2204.

When DBMS 210 detects that a contention risk condition has terminated for a certain row interval associated to and mapped to a certain leaf page of leaf pages 2130, DBMS 210 can initiate INSERT operations so that transaction data stored to extended indexing structure 2204 during the terminated contention risk condition for the certain row interval is asynchronously inserted to a leaf page 2130 for the certain row interval and reconfigures indexing data of one or more non-leaf page 2120 to specify that subsequent database operations referencing the certain row interval are to be performed using leaf page 2130 accordingly to normal operation of database system 110 rather than extended indexing structure 2204.

Subsequent and responsively to determining that a contention risk condition has terminated for a certain row interval, database query operations, e.g., SELECT and INSERT can be performed using leaf pages 2130 according to normal operation of database system 110.

In one aspect, DBMS 210 can be configured to perform contention locks (e.g., row locks or page locks) on leaf pages 2130 and can be absent of a capability of performing contention locks on extended indexing structure 2204. Accordingly, for a time that a contention risk condition persists for a certain row interval and database operations are performed using extended indexing structure 2204, INSERT and SELECT queries performed using extended indexing structure 2204 can be performed without triggering contention locks. Accordingly, INSERT and SELECT operations can be performed without delays resulting from lock operations, thus reducing latencies in the performance of database 108.

DBMS 210 can be configured so that index management process 213 detects for a contention risk condition according to various alternate methods. According to one method, DBMS 210 detecting for a contention risk condition can include DBMS 210 detecting a frequency of receipt of row insertion queries defined by INSERT query statements. In one example, DBMS 210 running index management process 213 can detect according to detecting process 2131 that a contention risk condition is present when a frequency of incoming INSERT query statements for a certain row interval satisfies a certain threshold frequency indicative of there being a contention risk condition. In another aspect, DBMS 210 running detecting process 2131 can determine that a contention risk condition for a certain row interval is not present when a frequency of incoming INSERT query statements for the certain row interval does not satisfy the certain threshold frequency indicative of there being a contention risk condition.

In another example, DBMS 210 running index management process 213 and detecting process 2131 can detect that a contention risk condition for a certain row interval is present when a number of contention locks performed by DBMS 210 over a certain unit time period satisfies a contention lock count threshold. DBMS 210 running index management process 213 can include DBMS 210 running activating process 2132 in response to a determination that a contention risk condition has been detected for a certain row interval.

On the detection of a contention risk condition for a certain row interval associated to a certain leaf page of leaf pages 2130, DBMS 210 can run activating process 2132 in order to activate for the certain row interval an extended indexing structure of an index. In activating an extended indexing structure for a certain row interval, DBMS 210 can reconfigure indexing data of a non-leaf page 2120 of an index structure specifying the certain row interval so that the non-leaf page references the extended indexing structure and specifies that INSERT query operations within the certain row interval are to be performed using the extended indexing structure rather than a baseline indexing structure defining an index.

DBMS 210 running index management process 213 and deactivating process 2133 can deactivate extended indexing structure 2204 for a certain row interval responsively to a detecting by rerunning a detecting process 2131 that a contention risk condition has terminated for a certain row interval. DBMS 210 running database operations process 213 for a time that an extended indexing structure is active for a given row interval can use the extended indexing structure for performance of database operations for the given certain row interval. DBMS 210 running index management process 213 and deactivating process 2133 can include DBMS 210 for a certain impacted row interval removing reference to the extended indexing structure so that subsequent query operations for the certain row interval are performed using a baseline indexing structure of an index.

In another aspect, DBMS 210 can manage the allocation of memory addresses to components of baseline indexing structure 2104 and extended indexing structure 2204. In reference to memory map 3600 of FIG. 1C, a memory address pool 3602 can include a sequence of memory addresses.

FIG. 2 is a flowchart depicting a method for performance by database system 110 interoperating with UE devices 130A-130Z. At block 1101, database system 110 can be receiving transaction data from UE devices 130A-130Z which can be sending request data iteratively at block 1301.

Transaction data can include, e.g., INSERT query data defining a request to insert data record into a certain database table and/or SELECT query data defining a request to access data from a certain database table. In response to the receiving of transaction data at block 1101, database system 110 can proceed to block 1102. INSERT query data can be defined by incoming INSERT query statements. SELECT query data can be defined by incoming SELECT query statements.

At block 1102, database system 110 can determine whether extended indexing structure 2204 is active for a row interval of a current database clearly defined by the most recent iteration of transaction data received at block 1101.

Where extended indexing structure 2204 is not active for the row interval of the current query (first condition), database system 110 can proceed to block 1103. In one example, the row interval referred to at block 1102 can include the row interval associated to a certain leaf page of leaf pages 2130 (FIG. 1B) associated to the current incoming database query. Where extended indexing structure 2204 is active for the row interval of the current query (second condition), database system 110 can proceed to block 1112.

At block 1103 (performed when the first condition is satisfied), database system 110 can perform the operation of the current query using baseline indexing structure 2104 as shown in FIG. 1B. Database system 110 performing at block 1103 can include DBMS 210 storing, in the case of an INSERT query, a data record into an appropriate leaf page of leaf pages 2130 in dependence on indexing data specified within a root page 2110 and one or more non-leaf page 2120.

Database system 110 performing block 1103 (performed when the first condition is satisfied) can include DBMS 210 storing received transaction data to an appropriate leaf page of leaf pages 2130 of baseline indexing structure 2104 associated to the row interval of the current query. At block 1103, database system 110 can perform the operation of the current query using baseline indexing structure 2104 as shown in FIG. 1B. Performing the operation of the current query according to block 1103 using baseline indexing structure 2104 can include DBMS 210, in the case of an INSERT query, storing a record defined within the received query data received at block 1101 into an appropriate certain leaf page of leaf pages 2130 as shown at FIG. 1B, in accordance with indexing data specified within root page 2110 and non-leaf pages 2120.

At block 1112 (performed when the second condition is satisfied and the query is an INSERT query or SELECT query referencing data stored in the extended indexing structure 2204), database system 110 can perform the operation of the current query using extended indexing structure 2204 as shown in FIG. 1B. Database system 110 performing the operation of the current query at block 1112 can include DBMS 210 storing, in the case of an INSERT query, a data record into an appropriate key order chain 2210 of extended indexing structure 2204.

On completion of block 1103 or block 1112, database system 110 can proceed to outputting block 1104. At outputting block 1104, database system 110 can output retrieved data retrieved from a table of a database in the case that a query whose operation was performed at the receiving block 1103 was a SELECT query resulting in access of data.

At outputting block 1104, database system 110 can send received retrieved messaging data resulting from operation of a SELECT query (in the case the most recent query was a SELECT query) to an appropriate one of UE device of UE devices 130A-130Z which UE device can perform receiving of the retrieved messaging data at block 1302. On completion of outputting block 1104, database system 110 can proceed to logging block 1105.

At logging block 1105, database system 110 can perform generating of logging data that specifies attributes of performance of actions by database system 110 including instances of performance of block 1101, 1102, 1103, 1111, 1112 and/or block 1104. Logging data, in one aspect, can include logging data that specifies the type and timestamp of receipt of each new instance of query data received at receiving block 1101. Logging data can include such data as types of queries received, timestamps specifying the time of receipt of such queries, UE device address data associated to received transaction data and the like. Logging data can include transaction data such as data that specifies types of queries received, timestamps specifying the time of receipt of such queries, performance of query statement operations, UE device address data associated to received transaction data and the like. Database system 110 performing logging block 1105 can include database system 110 storing logging data into logging area of data repository 208. On completion of logging block 1105, database system 110 can proceed to examining block 1106.

At block 1106, database system 110 can perform examining of historical logging data stored over prior iterations of logging block 1105. When iterations of query data have been received block 1101 and subject to processing at blocks 1103, or 1112, iterations of logging data can be stored in logging data area 251. At examining block 1106, according to one embodiment, DBMS 210 can perform examining of a frequency of received INSERT queries at each row interval of a column. In determining a frequency of received INSERT queries for certain row interval mapping of a certain leaf page of leaf pages 2130, DBMS 210 can examine logging data that specifies a history of receipts of INSERT query statements for the certain row interval during a time window beginning at a time earlier than the current time and ending at the current time.

Referring to FIG. 1B, the various row intervals associated to a column can be associated, respectively, to different leaf pages of leaf pages 2130, so that a first leaf page stores a first row interval, a second leaf page stores a second row interval, and so on. In the described, row intervals can change over time as the number of leaf pages, e.g., as the number of leaf pages expands or contracts.

At examining block 1106, DBMS 210 can perform examining of each row interval associated to each leaf page to ascertain whether there is a contention risk condition associated to the row interval and leaf page. For ascertaining whether there is a contention risk condition, DBMS 210, in one embodiment, can determine whether contentions being experienced by database 108 are such that performance of database system 110 according to one or more performance metric is expected to degrade performance such that performance of database 108 does not satisfy a performance threshold. The performance threshold can be e.g., determined based on a metric specified in a service level agreement (SLA). In another example, such a performance threshold can be administrator user specified.

DBMS 210 detecting a contention risk condition, in one embodiment, can include DBMS 210 detecting a frequency of receipt of row INSERT queries. In one example, DBMS 210 running index management process 213 can detect according to detecting process 2131 that a contention risk condition is present when a frequency of incoming INSERT queries for a row interval satisfies a certain frequency threshold indicative of there being a contention risk condition. DBMS 210 running detecting process 2131 can determine that a contention risk condition for a certain row interval is not present when a frequency of incoming INSERT queries for the certain row interval does not satisfy the certain frequency threshold.

In another example, DBMS 210 running index management process to 213 and detecting process 2131 can detect that a contention risk condition for a certain row interval is present when a number of contention instances over a certain unit time period satisfies a contention count threshold. DBMS 210 running index management process 213 can include DBMS 210 running activating process 2032 in response to a determination that a contention risk condition has been detected for a certain row interval.

Figure 3A:
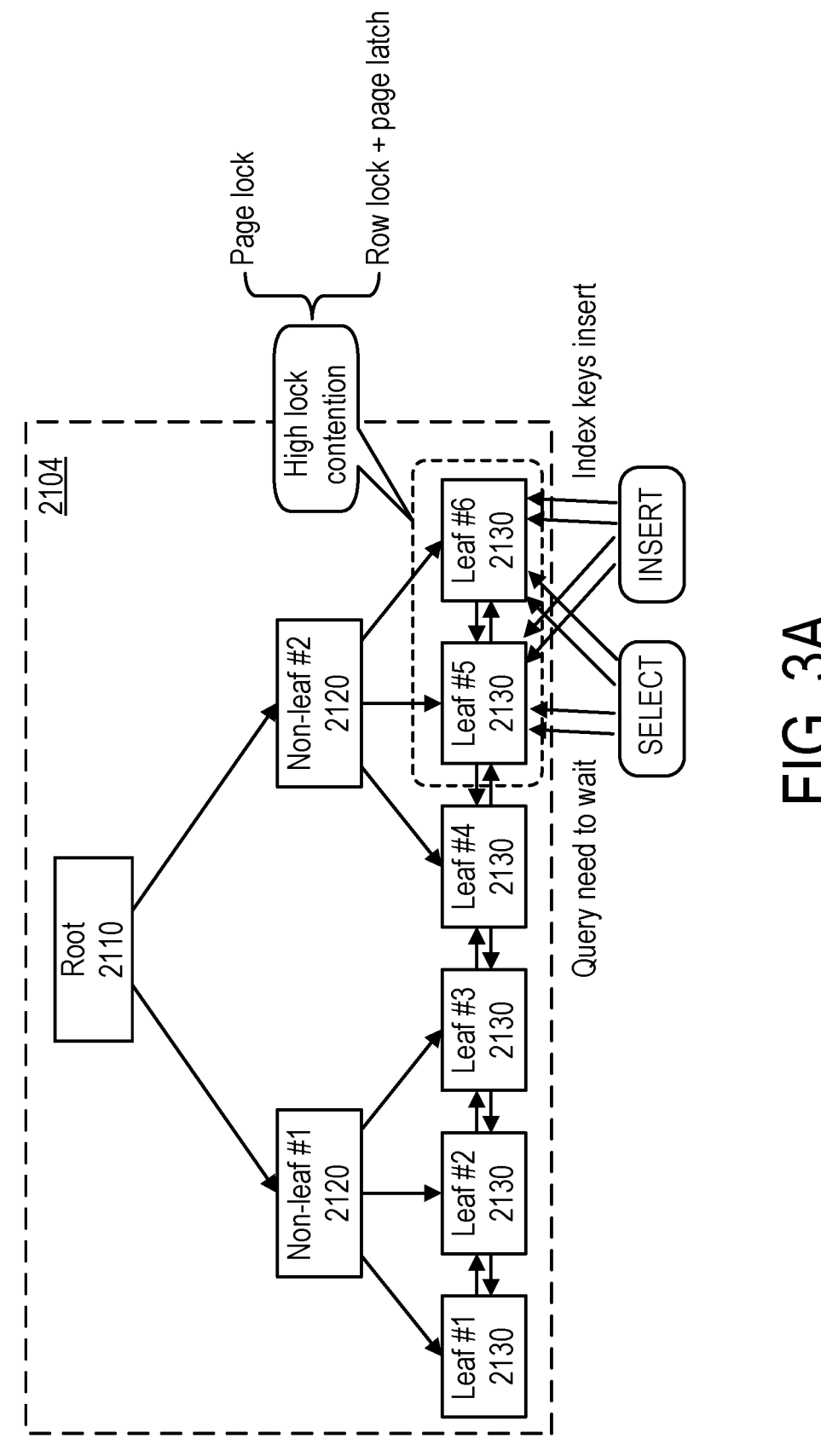
FIG. 3A is a database index view illustrating a contention lock according to one embodiment.
Figure 3B:
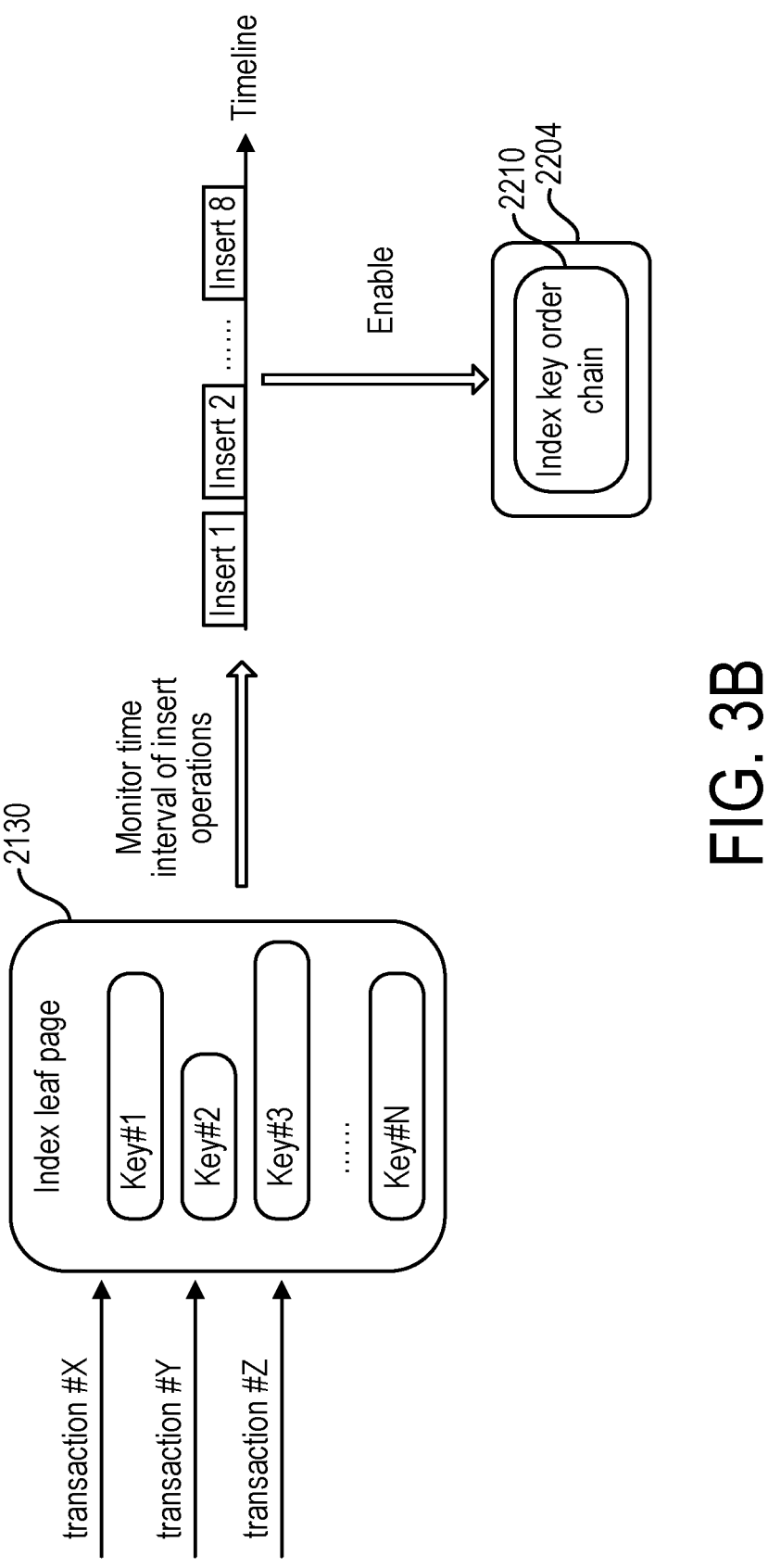
FIG. 3B is a flow diagram illustrating detection of a contention risk condition according to one embodiment.

FIGS. 3A and 3B illustrate DBMS 210 performing examining at block 1106 for determining whether a contention risk condition is present for respective row intervals mapping to respective leaf pages of leaf pages 2130 of a column index defined by index architecture 2102. Referring to FIG. 3A, DBMS 210 can be configured so that when inserting transaction data into a leaf page 2130, DBMS 210 locks DBMS 210 from performing a SELECT query operation for accessing stored transaction data from a leaf page 2130. The locking functionality assures that correct data is acquired by the SELECT operation and satisfies isolation requirements. The described locking functionality while providing assurance for the acquisition of correct data and satisfaction of isolation requirements can increase latencies associated to database operations.

Embodiments herein recognize that multiple operations can be in contention with one another when the operations attempt to access the same data at the same time. DBMS 210 can be configured to determine that a contention risk condition is present when performance of database 108 is expected to fail to satisfy the performance threshold. Database system 110 can perform examination of logging data to determine that a contention risk condition is present, indicative of an expectation that a performance threshold will not be satisfied.

Referring to FIG. 3B, DBMS 210 at examining block 1106 can determine that a contention risk condition is present by monitoring a time interval of receipt of INSERT query statements by DBMS 210. Where DBMS 210 determines that a time interval of receipt of INSERT queries received by DBMS 210 for a certain row interval mapping to a certain index leaf page of leaf pages 2130 satisfies a low time interval threshold, DBMS 210 can ascertain that a contention risk condition is present for the row interval. Referring to FIG. 3B, DBMS 210 for determining that a contention risk condition is present for a certain row interval mapping to the certain leaf page of leaf pages 2130 can monitor the frequency of INSERT queries received and INSERT operations performed by DBMS 210 for the certain row interval over a selected time.

In one example, DBMS 210 for determining the frequency of receipt of INSERT queries can monitor the time interval of receipt of INSERT queries. Where the average time interval between INSERT queries received by DBMS 210 for a certain grow interval satisfies a certain high frequency threshold, DBMS 210 can return the database status that the current row interval mapping to a certain leaf page of leaf pages 2130 exhibits the status of contention risk condition "present". DBMS 210 can ascertain that a certain row interval features a contention risk condition "not present" status based on the frequency of INSERT operations satisfying a certain low frequency threshold.

Accordingly, there is set forth herein, according to one embodiment, generating database logging data of a database 108, wherein the database includes a certain leaf page associated to a certain row interval, e.g., a certain leaf page block 1108 of any instances of a contention risk condition being initially detected, database system 110 by selection and operation of the YES path of block 1108 can proceed to block 1113. Table A depicts statuses over time in a prophetic example.

After substantial iterations of recording block 1107 have been completed for multiple queries, status register 252 can record therein status data as specified in the example of Table A below.

TABLE A

| Time | row interval (leaf page) | | | | | |
| | leaf page A | leaf page B | leaf page C | leaf page D | leaf page E | leaf page F |
| --- | --- | --- | --- | --- | --- | --- |
| . . . | . . . | . . . | . . . | . . . | . . . | . . . |
| T98 | Not Present | Not Present | Not Present | Present | Not Present | Not Present |
| T99 | Not Present | Not Present | Not Present | Present | Not Present | Not Present |
| T100 | Present | Not Present | Not Present | Present | Not Present | Not Present |
| T101 | Present | Not Present | Not Present | Present | Not Present | Not Present |
| T102 | Present | Not Present | Not Present | Not Present | Not Present | Not Present |
| T103 | Present | Not Present | Not Present | Not Present | Not Present | Not Present |
| . . . | . . . | . . . | . . . | . . . | . . . | . . . | of leaf pages 2130; examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure, which can be defined by extended indexing structure 2204 external to the certain leaf page, wherein the determining that a contention risk condition is present for the certain row interval includes analyzing time interval data of the logging data that specifies receipt times of incoming INSERT query statements referencing the certain row interval for a history of incoming INSERT query statements, and finding from the analyzing that a time interval of incoming INSERT query statements referencing the certain row interval for a time window of interest satisfies a time interval threshold indicative of the contention risk condition for the certain row interval being present.

Referring back to FIG. 2, on completion of examining block 1106, database system 110 can proceed to recording block 1107. At recording block 1107, DBMS 210 can record, e.g., in data repository 208 and/or baseline indexing structure 2104 the current status of each row interval associated to respective ones of leaf pages 2130. The status recorded at block 1107 can include a first status or a second status. The first status can be the status of contention risk condition "present" and the second status can be contention risk condition "not present". On completion of recording block 1107, database system 110 can proceed to block 1108.

At block 1108, DBMS 210 can ascertain by analyzing of recorded data recorded at recording block 1107 whether the contention risk condition has been initially detected for any row interval of a current column associated to a particular one of leaf pages 2130. DBMS 210 performing the decision of block 1108 can include DBMS 210 examining recorded statuses recorded at block 1107 over time to ascertain any row intervals subject exhibiting a status change at the previous iteration of recording block 1107 from the status contention risk condition "not present" to the new status of contention risks condition "present". On the identification of It is seen with reference to Table A that, at time T100, the row interval associated to leaf page A transitions from a risk "not present" to risk "present" status. Further, in respect to Table A, the row interval associated to leaf page D transitions from contention risk condition "present" status to contention risk condition "not present" status at time T102.

At block 1108, DBMS 210 can ascertain from the recording data, e.g., as specified in Table A, recorded at block 1107 which row intervals mapping the leaf pages transition from contention risk condition "not present" status to contention risk condition "present" status. DBMS 210 at time T100 in the example of table A can note from the status register data that the row interval mapping to leaf page A transitioned from risk "not present" to risk "present" status and can proceed in such a scenario to block 1113 to activate extended indexing structure 2204 for the specified transitioning row interval.

On completion of block 1108, database system 110 can proceed to block 1109. At block 1109, DBMS 210 can ascertain from the status register data as specified in Table A whether any row intervals of a column index have transitioned from a contention risk "present" status to a contention risk condition "not present" status. For example, with reference to Table A, DBMS 210, when performing block 1109 at time T102 can ascertain that the row interval associated to leaf page D has transitioned from contention risk condition "present" status to contention risk condition "not present" status and accordingly, DBMS 210 can branch in such a situation to block 1114 to perform deactivation of extended indexing structure 2204 for the specified row interval D. Accordingly, once no contention risk condition is detected, DBMS 210 can deactivate extended indexing structure 2204 for the specified row interval D.

At completion of block 1109, database system 110 can proceed to return block 1115. At return block 1115, database system 110 can return to a stage preceding block 1101 to receive a next iteration of query data defining a query request received responsively to transaction data iteratively sent by UE devices 130A-130Z at block 1301. Database system 110 can iteratively perform the loop of blocks 1101 to 1115 during a deployment period of database system 110. The loop of blocks 1101 to 1115 depicts iterative operation, but it is understood, for example, that iteration of the loop can be performed in some instances at overlapped times, or in some instances simultaneously.

UE devices 130A-130Z can iteratively perform the loop of blocks 1301, block 1302, and block 1303 during a deployment period of UE devices 130A-130Z.

For activating an extended indexing structure 2204 for a certain row interval associated to a certain leaf page of leaf pages 2130 at block 1113, DBMS 210 can reconfigure indexing data of one or more non-leaf page 2120 of baseline indexing structure 2104 to specify that subsequent INSERT queries referencing the certain row interval (for a time that a contention risk condition is present) are to be performed using extended indexing structure 2204 rather than a leaf page to which the certain row interval is associated.

Subsequently, with extended indexing structure 2204 active for the certain row interval, subsequent INSERT queries referencing the certain row interval subsequent insert queries referencing for insertion of records within the certain row interval (for a time that a contention risk condition is present for the certain row interval) will be performed using extended indexing structure 2204 rather than a leaf page. DBMS 210 performing an INSERT query for a certain row interval associated to a certain leaf page using extended indexing structure 2204 can include DBMS 210 storing INSERT query transaction data (for a time that a contention risk condition is present for the certain row interval) within a certain key order chain of extended indexing structure 2204 that is associated to the certain row interval and leaf page 2130. DBMS 210 performing an insert query using extended indexing structure 2204 can include DBMS storing INSERT query transaction data to the certain key order chain without triggering a contention lock.

When DBMS 210 performs an INSERT operation referencing a preexisting row of a table using indexing structure 2104, the INSERT operation can be performed without deletion of row data of the preexisting row. More specifically, DBMS 210 in performing an INSERT operation referencing a preexisting certain table row can store the transaction data of an INSERT query into the certain key chain of the extended indexing structure 2204 without deletion of the row data from the certain leaf page of leaf pages 2130 such that database 108 stores multiple versions of the same row data, the old version of the row data being stored on the certain leaf page of leaf pages 2130 and the "new" version of the row data of the certain table row on the certain key order chain 2210 of the extended indexing structure 2204. The "old" version remaining on the certain leaf page of leaf pages 2130 can be deleted at a later time on determination that the contention risk condition has termination for the certain row interval associated to the certain leaf page responsively to which DBMS 210 can perform asynchronous insertion of row data of the key order chain to the certain leaf page of leaf pages 2130, which asynchronous insertion of row data can include deleting the "old" version of the row data values on the certain leaf page, where inserted transaction data values obtained from the certain key order chain to the certain leaf page were stored on the certain key order chain as a result of processing of an INSERT query statement referencing a preexisting row. Because the described INSERT operation using extended indexing structure 2104 can be performed without deletion of pre-existing row data (which can be retained on the certain leaf page), the operation can be performed with minimal latency and minimal likelihood of defining a contention with a subsequent operation. The subsequent asynchronous INSERTION at the termination of a contention risk condition can satisfy isolation requirements.

Accordingly, there is set forth herein according to one embodiment, generating database logging data of a database 108, wherein the database includes a certain leaf page associated to a certain row interval, e.g., a certain leaf page of leaf pages 2130 (FIG. 1B); examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure, which can be defined by extended indexing structure 2204 external to the certain leaf page, wherein the method includes, during a time in which the contention risk condition persists for the certain row interval, receiving an INSERT query statement including new data for a pre-existing row that is stored on the certain leaf page, and, in response to the receiving, storing the new data for the preexisting row on the external indexing structure while retaining old data for the preexisting row on the certain leaf page, wherein the new data for the preexisting row defines transaction data of the subsequent INSERT query statement transaction data, wherein the method includes, responsively to ascertaining that the contention risk condition has terminated for the certain row interval, deleting the old data for the preexisting row from the certain leaf page, and storing the new data for the preexisting row to the certain leaf page.

For activating an extended indexing structure 2204 for a certain row interval associated to a certain leaf page of leaf pages 2130 at block 1113, DBMS 210 can further reconfigure indexing data of the one or more non-leaf page 2120 of baseline indexing structure to specify that SELECT query operations of a SELECT query statement received at block 1101 referencing the certain row interval are to be performed using the extended indexing structure 2204 where the SELECT query statement references a row stored in the extended indexing structure 2204. In the case of a SELECT query statement, DBMS 210 at block 1111 can ascertain by examination of indexing data of the one or more non-leaf page 2120 whether the SELECT query statement references row data that has been stored to a key value order chain of extended indexing structure, and if so, DBMS 2210 can proceed to block 1112 to perform the SELECT query operation by accessing the row data from the extended indexing structure 2204. Otherwise, DBMS 210 can proceed to block 1103 to perform the SELECT operation by accessing the row data from the certain leaf page of leaf pages 2130 according to normal operation. When INSERT operations are performed to store new row data (column values) to a certain key order chain of key order chains 2210 of extended indexing structure 2204, DBMS 210 can reconfigure indexing data of the one or more non-leaf page 2120 so the indexing data references that the new row data has been stored to the certain key order chain of key order chains 2210 of extended indexing structure 2204. Thus, the reconfigured indexing data can indicate when incoming SELECT queries are to be performed by accessing row data from extended indexing structure 2204.

For performance of deactivating extended indexing structure 2204 for a certain row interval associated to a certain leaf page of leaf pages 2130 at block 1114, DBMS 210 can initiate INSERT operations so that key values stored into the extended indexing structure 2204 within the certain key value chain 2210 associated to the certain row interval for the time the contention risk condition was present are asynchronously inserted in the certain leaf page of leaf pages 2130 associated to the certain row interval. DBMS 210 can perform the asynchronous insertion of the key values at block 1114 in a manner that emulates the operation of INSERT operations at block 1103, e.g., with the application of contention locks (e.g., row locks, page locks) so that row data can be changed in a manner to derive the isolation benefits associated to contention locks at block 1103. DBMS 210, e.g., by examination of logging data recorded at block 1105 can perform the asynchronous insertion of the key values at block 1114 according to the ordering of INSERT queries received at receiving block 1101 that resulted in key values being stored in extended indexing structure 2204.

In further reference to deactivate block 1114, DBMS 210, on completion of the described asynchronous insertion of key values into the certain leaf page of leaf pages 2130, can reconfigure indexing data of an appropriate non-leaf page 2120 of baseline indexing structure 2104 to specify that subsequent operations (for the time the risk "not present" condition persist) referencing the certain row interval are performed using the certain leaf page of leaf pages 2130. Subsequently, with extended indexing structure 2204 inactive for the certain row interval, DBMS 210 can perform operations of current query at block 1103 for the certain row interval using baseline indexing structure 2104, e.g., by storing transaction data of an insert query into an appropriate leaf page of leaf pages 2130 (and not extended indexing structure 2204) according to indexing data of the appropriate non-leaf page of non-leaf pages 2120. Contention locks can be active when DBMS 2210 stores insertion query transaction data to an appropriate certain leaf page according to block 1103; however, since a contention risk condition indicative of unsatisfactory database performance is not present, satisfactory database performance can be expected to be achieved.

Accordingly, there is set forth herein, according to one embodiment, generating database logging data of a database 108, wherein the database includes a certain leaf page associated to a certain row interval, e.g., a certain leaf page of leaf pages 2130 (FIG. 1B); examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure, which can be defined by extended indexing structure 2204 external to the certain leaf page, wherein the method includes, responsively to ascertaining that the contention risk condition has terminated for the certain row interval, asynchronously inserting stored transaction data values of the external indexing structure to the certain leaf page, and storing further subsequent incoming INSERT query statement transaction data values to the certain leaf page.

Figure 4:
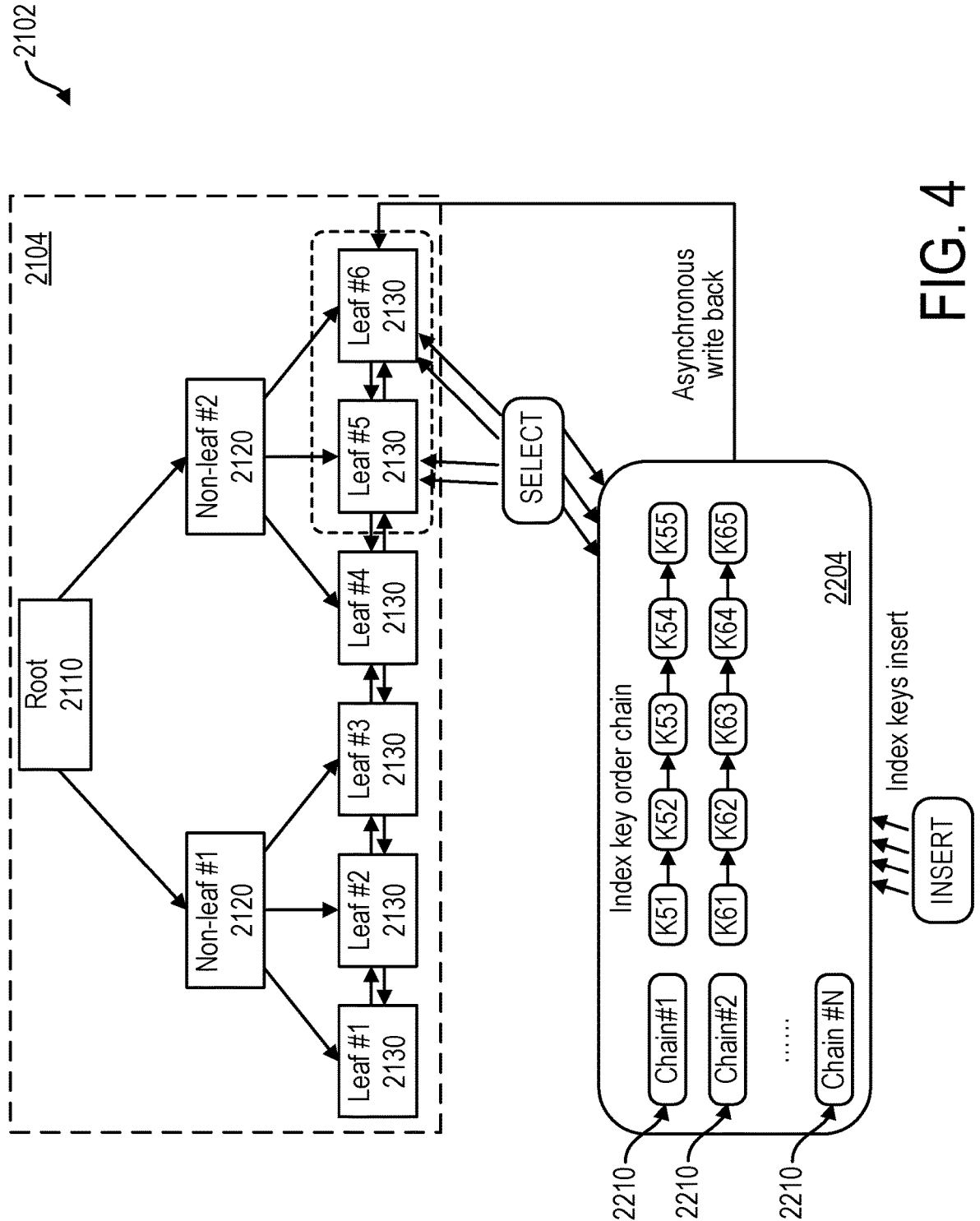
FIG. 4 is a database index view illustrating a contention lock according to one embodiment.

FIG. 4 illustrates various functions that can be performed when extended indexing structure 2204 has been activated for a certain row interval mapping to a certain leaf page of leaf pages 2130 based on detection of a contention risk condition for the certain row interval. When a new incoming INSERT query statement referencing the certain row interval is received, INSERT operations can include storing row data to a certain key order chain associated to the certain row interval. The storing of the row data can be performed without deletion of pre-existing row data even where the INSERT operation references a pre-existing row within the certain row interval. Incoming SELECT operations can be performed by accessing row data from the certain leaf page of leaf pages 2130 when the incoming SELECT query triggering the SELECT operation does not reference row data stored the certain key order chain associated to the certain row interval. Incoming SELECT operations can be performed by accessing row data from the certain key order chain when the incoming SELECT query triggering the SELECT operation references row data stored the certain key order chain of extended indexing structure 2204. When the contention risk condition is determined by DBMS 210 to have terminated for the certain row interval, DBMS 210 can trigger the performance of further subsequent INSERT operations so that for further subsequent INSERT operations referencing the certain row interval, row data is stored on the certain leaf page of leaf pages 2130 for the certain row interval.

Figure 5:
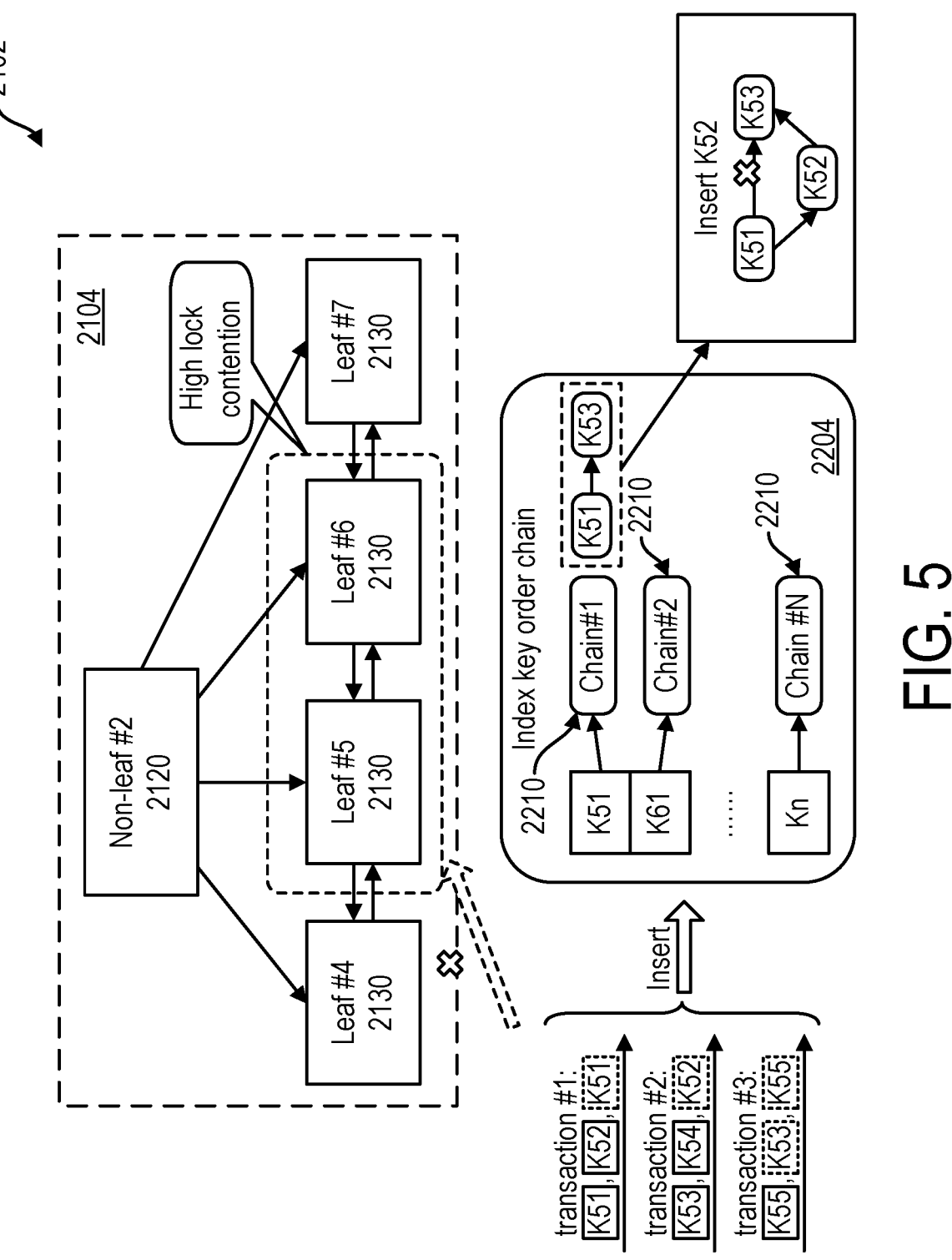
FIG. 5 is a database index view illustrating insertion of key values according to one embodiment.

When a contention risk condition is detected for a certain row interval, DBMS 210 can activate extended indexing structure 2204 for the certain row interval. In one aspect, DBMS 210 activating extended indexing structure 2204 for the certain row interval can include DBMS 210 establishing a certain key order chain 2210 for the certain row interval associated to a certain leaf page of leaf pages 2130. On establishment of the certain key order chain, the certain key order chain can inherit the characteristics of the certain leaf page of leaf pages 2130 to which it is associated. Extended indexing structure 2204 defining key order chains 2210 can be defined on a common memory device that defines leaf pages 2130. When a leaf page or key order chain is deleted, DBMS 2210 can allocate the memory addresses to an open memory address pool and later assign addresses of the memory address pool to new leaf pages or key order changes. Database system 110 can be configured so that established key order chains can emulate the functionality of their associated leaf page. In one example, as shown in FIG. 5, DBMS 210 can store new column values according to a proper ordering. When the key value for column C1=K52 arrives after the key value C1=K51 and after the key value C1-K53, DBMS 210 can perform the INSERT operation so that K52 is inserted in memory address space of the certain key order chain after K1 and before K53.

Figure 1C:
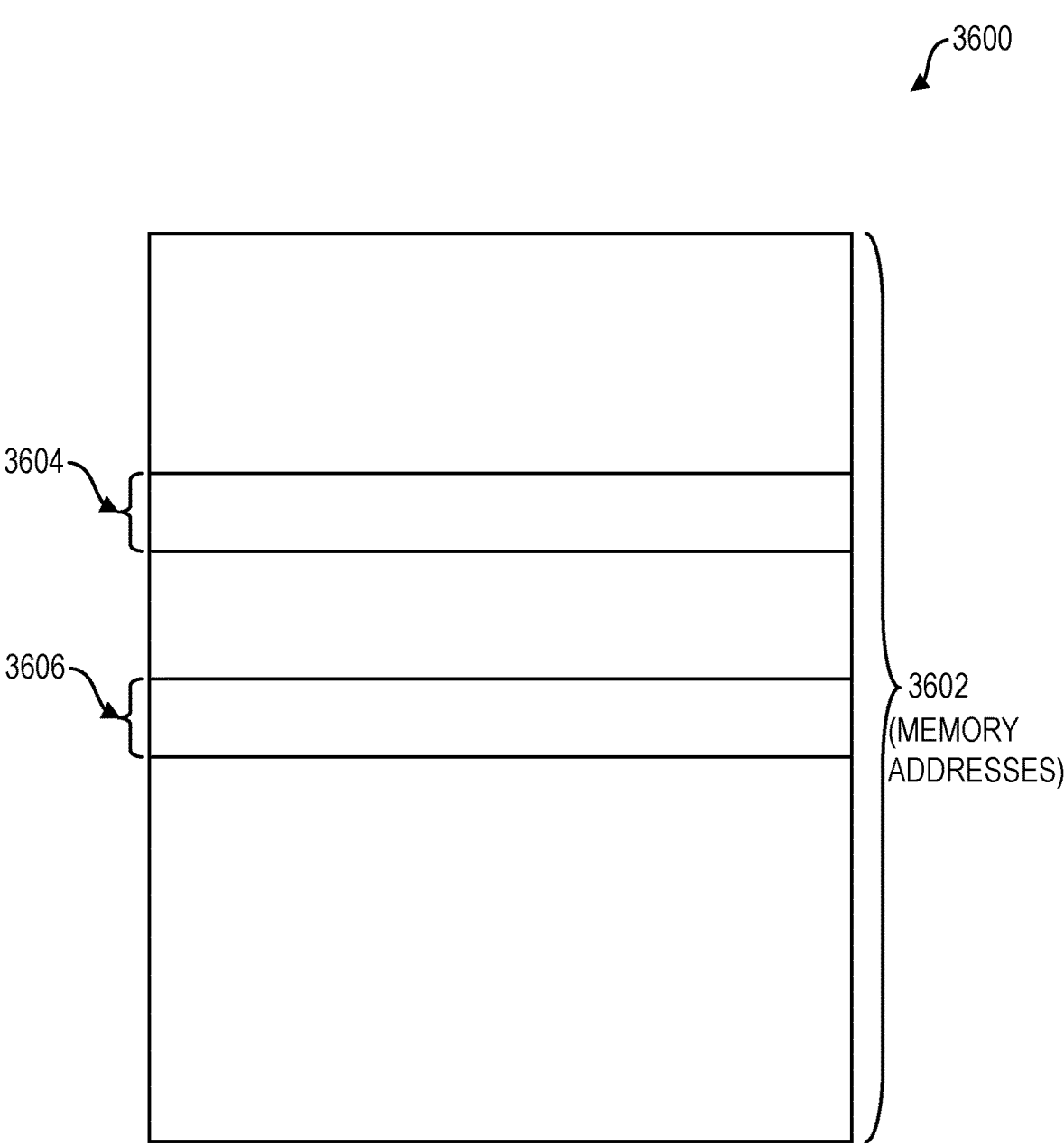
FIG. 1C depicts a memory map according to one embodiment.

DBMS 210 managing a memory address pool is described further in reference to the memory map 3600 of FIG. 1C. In reference to memory map 3600 of FIG. 1C, a memory address pool 3602 can include a sequence of memory addresses. The sequence of memory addresses can be defined on a common memory device, according to one example. On the activation of extended indexing structure 2204 for a certain row interval, DBMS 210 can assign a second set of memory addresses 3606 within memory address pool 3602 for defining a key order chain 2210 for the certain row interval while maintaining a first set of memory addresses 3604 within the memory address pool 3602 defining a leaf page of leaf pages 2130 for the certain row interval. In the manner described, DBMS 210 can instantiate a key order chain 2210 for a certain row interval so that the key order chain 2210 for a certain row interval external to a leaf page 2130 for the certain row interval are instantiated simultaneously and concurrently. In another example, DBMS 210 can manage memory address allocations so that DBMS 210 allocates memory addresses for defining leaf pages of leaf pages 2130 from a first memory address pool, and allocates memory addresses for defining key order chains of key order chains 2130 from a second memory address pool. In such an example, DBMS 210 can be restricted from allocating memory addresses for defining leaf pages of leaf pages 2130 from the second memory address pool, and can be restricted from allocating memory addresses for defining key order chains of key order chains 2130 from the first memory address pool.

Figure 6:
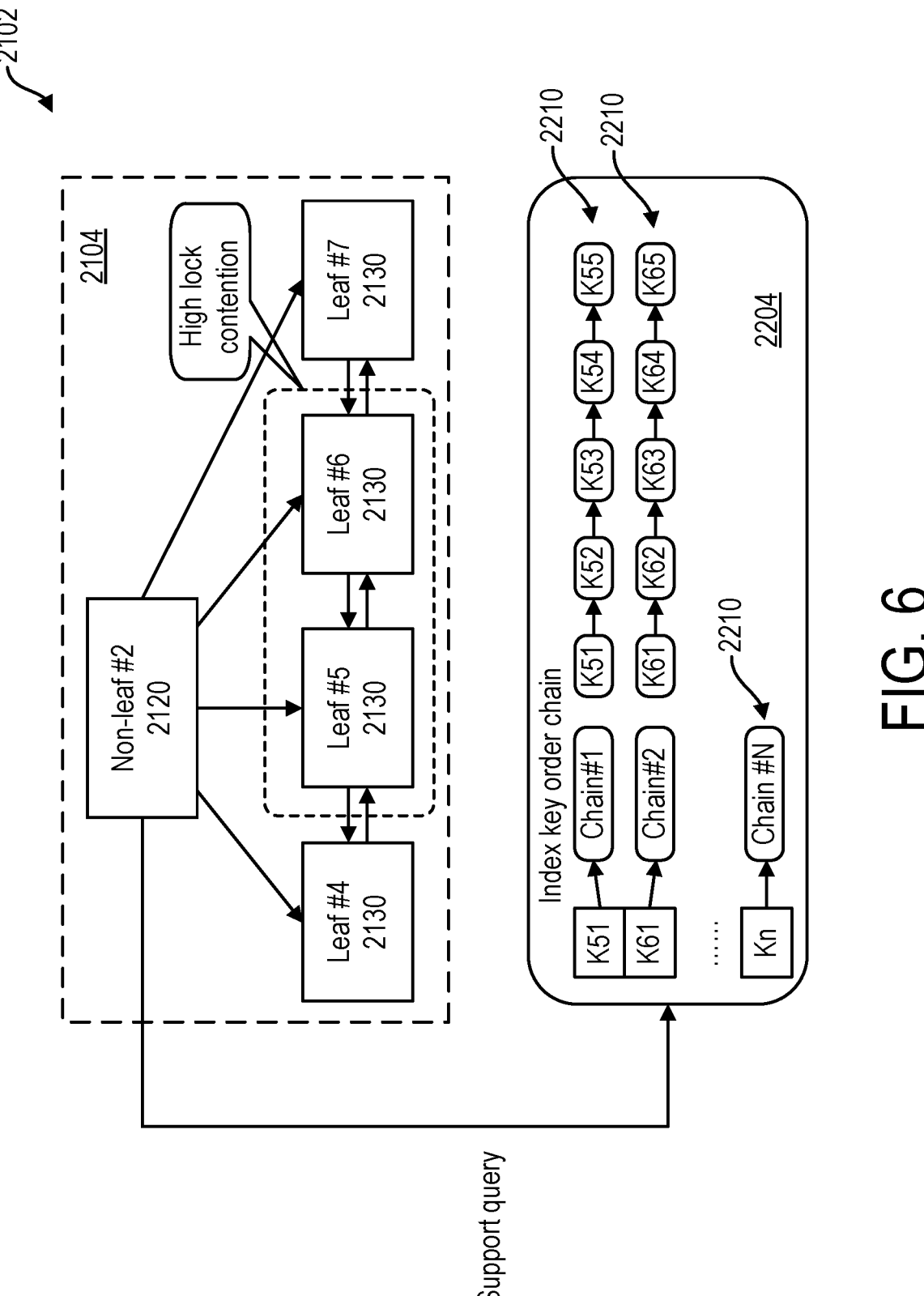
FIG. 6 is a database index view illustrating linkage between a non-leaf page and an extended indexing structure according to one embodiment.

As illustrated in FIG. 6, extended indexing structure 2204 can support SELECT queries resulting in access of column values from extended indexing structure 2204. When INSERT operations are performed to store row data (column values) to a certain key order chain of extended indexing structure 2204, DBMS 210 can reconfigure indexing data of the one or more non-leaf page 2120 so the indexing data references the new data stored to the certain key order chain of extended indexing structure 2204. In the case of a SELECT query statement, DBMS 210 at block 1111 can ascertain by examination of indexing data of the one or more non-leaf page 2120 whether the SELECT query statement references row data that has been stored to a key value order chain of extended indexing structure, and if so DBMS 2210 can proceed to block 1112 to perform the SELECT query operation by accessing the row data from the extended indexing structure 2204. Otherwise, DBMS 210 can proceed to block 1103 to perform the SELECT operation by accessing the row data from the certain leaf page of leaf pages 2130 according to normal operation.

Figure 7:
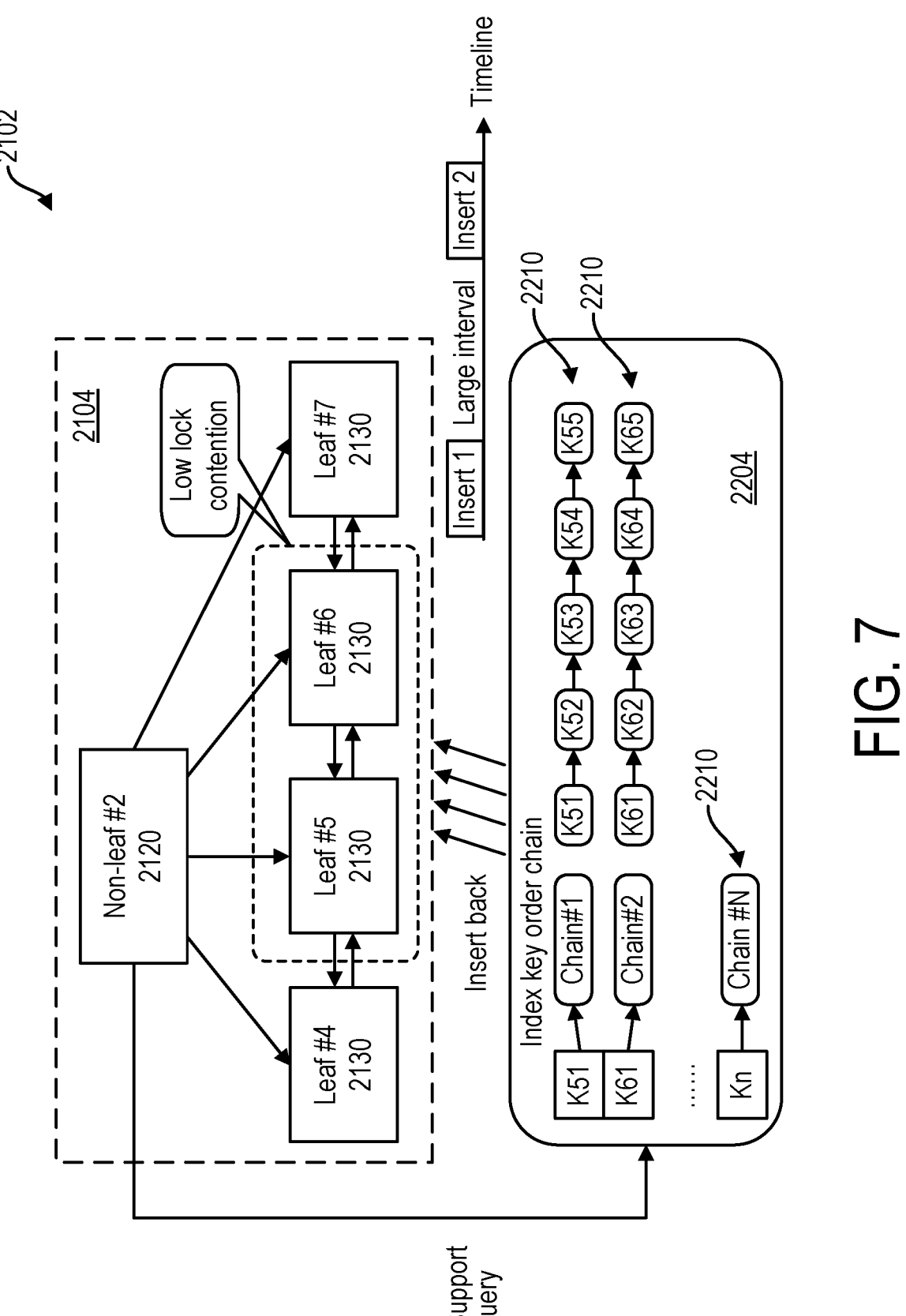
FIG. 7 is a database index view illustrating termination of a contention risk condition according to one embodiment.

When DBMS 210 determines that a contention risk condition has terminated for a certain row interval, DBMS 210 can deactivate extended indexing structure 2204 for the certain row interval. As indicated in FIG. 7, DBMS 210 for ascertaining that the contention risk condition for a certain row interval has terminated, can ascertain that a frequency of incoming INSERT query statements satisfies a low frequency threshold (which can be indicated by a time interval of receipt of incoming INSERT query statements satisfying a long time period threshold). For performance of deactivating extended indexing structure 2204 for a certain row interval associated to a certain leaf page 2103 at block 1114, DBMS 210 can initiate INSERT operations so that key values stored into the extended indexing structure 2204 within the certain key value chain 2210 associated to the certain row interval for the time the contention risk condition was present are asynchronously inserted in the leaf page associated to the certain row interval. DBMS 210 can perform the asynchronous insertion of the key values at block 1114 in manner that emulates the operation of INSERT operations at block 1103, e.g., with the application of contention locks (e.g., row locks, page locks) so that row data can be changed in a manner to derive the isolation benefits associated to contention locks at block 1103. DBMS 210, e.g., by examination of logging data recorded at block 1105 can perform the asynchronous insertion of the key values at block 1114 according to the ordering of INSERT queries received at receiving block 1101 that resulted in key values being stored in extended indexing structure 2204. DBMS 210 performing asynchronous insertion of key values to the certain leaf page can include DBMS deleting transaction data values from the certain leaf page where the inserted key values stored on the key order chain pertain to preexisting rows such that "old" row values were maintained on the certain leaf page of leaf pages 2130, as described herein.

DBMS 210, on completion of the described asynchronous insertion of key values into the certain leaf page of leaf pages 2130, can reconfigure indexing data of an appropriate non-leaf page of non-leaf pages 2120 of baseline indexing structure 2104 to specify that subsequent operations (for the time the risk "not present" condition persists) referencing the certain row interval are performed using the certain leaf page of leaf pages 2130. The described reconfiguring of indexing data "breaks the link" between the one or more non-leaf page 2120 and extended indexing structure 2204, as depicted in FIG. 7.

Subsequently, with extended indexing structure 2204 inactive for the certain row interval, DBMS 210 can perform operations of current query at block 1103 for the certain row interval using baseline indexing structure 2104, e.g., by storing transaction data of an insert query into an appropriate leaf page of leaf pages 2130 (and not extended indexing structure 2204) according to indexing data of the appropriate non-leaf page of non-leaf pages 2120. Contention locks can be active when DBMS 2210 stores insertion query transaction data to an appropriate certain leaf page according to block 1103; however, since a contention risk condition indicative of unsatisfactory database performance is not present, satisfactory database performance can be expected to be achieved.

Embodiments herein recognize that when SQL runs in a high concurrent environment, transactions containing SELECT or INSERT operations may run at the same time. When new rows are inserted into a base table, there can exist a heavy lock contention on a leaf page of an index when different transactions are trying to insert values into this leaf page simultaneously. Contentions not only impact INSERT performance severely, but also affects the performance of the SELECT operation.

Embodiments herein provide a new index type that can promote performance of INSERT and SELECT operations under heavy workload with high concurrency. Embodiments herein provide an extended indexing structure having an index key order chain 2210 to store inserted key values temporarily to reduce contention of lock request. On termination of a contention risk condition, the inserted values inserted into the index key order chain 2210 can be inserted into an index leaf page of leaf pages 2130 asynchronously. The index key order chain 2210 can support a query search at the same time.

Embodiments herein can detect a time interval of receipt of multiple INSERT query statements on the same certain leaf page of leaf pages 2130 associated to a common row interval, enable a certain index key order chain of key order chains 2210 of an extended indexing structure 2204 if a set of INSERT operations on the certain exhibits a threshold satisfying time interval. New incoming inserted key values can be inserted to a certain index key order chain 2210 within the order of index key. Meanwhile, there can be established a link between a non-leaf page 2120 and the index key order chain 2210 to support queries which can use indexing data of the non-leaf page to access the corresponding table having table data stored on the index key order chain 2210.

Figure 8:
FIG. 8 is a database index view illustrating termination of a contention risk condition according to one embodiment.

On the determination that a time interval of receipt of incoming subsequent INSERT query statements satisfies a high threshold indicative of a contention risk condition "not present" status, key values in the index key order chain 2210 can be inserted asynchronously to an index leaf page of leaf pages 2130. On the insertion of key values asynchronously to an index leaf pages of leaf pages 2130, embodiments herein can break the link between the certain non-leaf page of non-leaf pages 2120 and the certain index key order chain of key order chains 2210 as indicated in FIG. 8.

Embodiments herein can detect lock contention on a leaf page of an index dynamically. In one embodiment, index key order chain 2210 can support a query search. Performance of database INSERT and SELECT operations can be promoted significantly under heavy workload with high concurrency without isolation level changes.

Embodiments herein recognize that when SQL runs in a high concurrency environment, transactions containing SELECT or INSERT operations may run at the same time. When a new row is inserted into a base table, all related indexes defined on this base table can be modified correspondingly. However, there can be expected to be heavy lock contention on a leaf page 2130 when different transactions are trying to insert value into this leaf page simultaneously, which will impact INSERT performance.

In reference to behavior of INSERT and SELECT under high concurrency, embodiments herein recognize that INSERT operations can induce high lock contention and queries on the table need to wait to unlock. Embodiments herein introduce a new index type that can promote performance of INSERT and SELECT operations under heavy workload with high concurrency. Embodiments herein provide an index key order chain 2120 to store inserted values temporarily to reduce contention of lock requests. Then, on termination of high concurrency, the inserted values can be inserted to an index leaf page of leaf pages 2130 asynchronously.

An index key order chain 2120 can support a query search with a SELECT operation at the same time. Embodiments herein can detect a time interval of receipt of multiple INSERT operations on the same leaf page of leaf pages 2130, and can enable an index key order chain 2120 if incoming INSERT operations have a threshold satisfying small interval. New incoming inserted key values can be inserted to one chain of an index key order chain 2120 within the order of index key. On the detection of a high concurrency condition defining by contention risk condition "present" status, embodiments herein can establish a link between a non-leaf page and the index key order chain 2210 to support query operations for access to key values stored in a key order chain 2120. On termination of a high concurrency condition, key values in an index key order chain 2210 can be inserted asynchronously to an index leaf page of leaf pages 2130. On termination of a high concurrency condition, embodiments herein can break the link between a non-leaf page of non-leaf pages 2120 and the index key order chain 2210.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes. The computer implemented method also includes generating database logging data of a database, where the database includes a certain leaf page associated to a certain row interval. The method also includes examining logging data of the database logging data, and based on the examining the logging data, determining that a contention risk condition is present with respect to the certain row interval. The method also includes in response to the determining that the contention risk condition is present with respect to the certain row interval, storing incoming subsequent INSERT query statement transaction data for the certain row interval to an external indexing structure external to the certain leaf page. Other embodiments of this aspect include corresponding computer systems, apparatus, and computer programs recorded on one or more computer storage devices, each configured to perform the actions of the methods.

Implementations may include one or more of the following features. The computer implemented method where the method includes responsively to ascertaining that the contention risk condition has terminated for the certain row interval, storing further subsequent incoming INSERT query statement transaction data values to the certain leaf page. The method includes responsively to ascertaining that the contention risk condition has terminated for the certain row interval, storing further subsequent incoming INSERT query statement transaction data values to the certain leaf page without imposing locks on the external indexing structure during the storing. The method includes responsively to ascertaining that the contention risk condition has terminated for the certain row interval, storing further subsequent incoming INSERT query statement transaction data values to the certain leaf page without imposing locks on the external indexing structure during the storing so that latencies associated to storing INSERT query transaction data on said extended indexing structure are reduced relative to storing so that latencies associated to storing INSERT query transaction data on said certain leaf page. The method includes responsively to ascertaining that the contention risk condition has terminated for the certain row interval, asynchronously inserting stored transaction data values of the external indexing structure to the certain leaf page. The method includes responsively to ascertaining that the contention risk condition has terminated for the certain row interval, asynchronously inserting stored transaction data values of the external indexing structure to the certain leaf page, and storing further subsequent incoming INSERT query statement transaction data values to the certain leaf page. The method includes responsively to ascertaining that the contention risk condition has terminated for the certain row interval, asynchronously inserting stored transaction data values of the external indexing structure to the certain leaf page, performing reconfiguration of indexing data of a certain non-leaf page to specify that further subsequent incoming insert query statement transaction data values are to be stored to the certain leaf page, and storing further subsequent incoming INSERT query statement transaction data values to the certain leaf page in accordance with the performing reconfiguration of indexing data. The method includes responsively to the determining that the contention risk condition is present for the certain row interval, reconfiguring indexing data of a non-leaf page associated to the certain leaf page to specify that the subsequent incoming query statements for the certain row interval are to be stored onto the external indexing structure. The determining that a contention risk condition includes analyzing time interval data of the logging data that specifies receipt times of incoming INSERT query statements referencing the certain row interval. The determining that a contention risk condition is present for the certain row interval includes analyzing time interval data of the logging data that specifies receipt times of incoming INSERT query statements referencing the certain row interval for a history of incoming insert query statements. The determining that a contention risk condition is present for the certain row interval includes analyzing time interval data of the logging data that specifies receipt times of incoming insert query statements referencing the certain row interval for a history of incoming INSERT query statements, and finding from the analyzing that a time interval of incoming INSERT query statements referencing the certain row interval for a time window of interest satisfies a time interval threshold indicative of the contention risk condition for the certain row interval being present. The determining that the contention risk condition is present for the certain row interval includes analyzing time interval data of the logging data that specifies receipt times of incoming INSERT query statements referencing the certain row inter-val, where the method includes ascertaining that the con-tention risk condition has terminated for the certain row interval, where the ascertaining that the contention risk condition has terminated for the certain row interval includes analyzing further time interval data of the logging data that specifies further receipt times of incoming insert query statements referencing the certain row interval. The determining that the contention risk condition is present for the certain row interval includes analyzing time interval data of the logging data that specifies receipt times of incoming INSERT query statements referencing the certain row inter-val, where the method includes ascertaining that the con-tention risk condition has terminated for the certain row interval, where the ascertaining that the contention risk condition has terminated for the certain row interval includes analyzing further time interval data of the logging data that specifies further receipt times of incoming INSERT query statements referencing the certain row interval, where the method includes responsively to the ascertaining that the contention risk condition has terminated for the certain row interval, asynchronously inserting stored transaction data values of the external indexing structure to the certain leaf page, and storing further subsequent incoming INSERT query statement transaction data values to the certain leaf page. The method includes, during a time in which the contention risk condition persists for the certain row inter-val, receiving a SELECT query statement referencing data stored on the external indexing structure, and, in response to the receiving, accessing the data stored on the external indexing structure. The method includes, during a time in which the contention risk condition persists for the certain row interval, receiving an INSERT query statement includ-ing new data for a preexisting row that is stored on the certain leaf page, and, in response to the receiving, storing the new data for the preexisting row on the external indexing structure while retaining old data for the preexisting row on the certain leaf page, where the new data for the preexisting row defines transaction data of the subsequent insert query statement transaction data. The method includes, during a time in which the contention risk condition persists for the certain row interval, receiving an INSERT query statement including new data for a preexisting row that is stored on the certain leaf page, and, in response to the receiving, storing the new data for the preexisting row on the external indexing structure while retaining old data for the preexisting row on the certain leaf page, where the new data for the preexisting row defines transaction data of the subsequent INSERT query statement transaction data, where the method includes responsively to ascertaining that the contention risk condi-tion has terminated for the certain row interval, deleting the old data for the preexisting row from the certain leaf page, and storing the new data for the preexisting row to the leaf page. Implementations of the described techniques may include hardware, a method or process, or computer soft-ware on a computer-accessible medium.

One general aspect includes a computer readable storage medium readable by one or more processing circuit and storing instructions for execution by one or more processor for performing. The computer program product also includes generating database logging data of a database, where the database includes a certain leaf page associated to a certain row interval. The product also includes examining logging data of the database logging data, and based on the examining the logging data, determining that a contention risk condition is present with respect to the certain row interval. The product also includes in response to the deter-mining that the contention risk condition is present with respect to the certain row interval, storing incoming subse-quent INSERT query statement transaction data for the certain row interval to an external indexing structure exter-nal to the certain leaf page. Other embodiments of this aspect include corresponding computer systems, apparatus, and computer programs recorded on one or more computer storage devices, each configured to perform the actions of the methods.

One general aspect includes. The system also includes a memory; at least one processor in communication with the memory. The system also includes generating database logging data of a database, where the database includes a certain leaf page associated to a certain row interval. The system also includes examining logging data of the database logging data, and based on the examining the logging data, determining that a contention risk condition is present with respect to the certain row interval. The system also includes in response to the determining that the contention risk condition is present with respect to the certain row interval, storing incoming subsequent INSERT query statement trans-action data for the certain row interval to an external indexing structure external to the certain leaf page. Other embodiments of this aspect include corresponding computer systems, apparatus, and computer programs recorded on one or more computer storage devices, each configured to per-form the actions of the methods.

Implementations may include one or more of the follow-ing features. The system where responsively to ascertaining that the contention risk condition has terminated for the certain row interval, storing further subsequent incoming INSERT query statement transaction data values to the certain leaf page. Responsively to ascertaining that the contention risk condition has terminated for the certain row interval, asynchronously inserting stored transaction data values of the external indexing structure to the certain leaf page, and storing further subsequent incoming INSERT query statement transaction data values to the certain leaf page. Implementations of the described techniques may include hardware, a method or process, or computer soft-ware on a computer-accessible medium.

Certain embodiments herein may offer various technical computing advantages involving computing advantages to address problems arising in the realm of computer systems and computer methods. Embodiments herein can reduce latencies in processing of database queries. Embodiments herein can monitor for the presence of a contentions risk condition with respect to a certain row interval. When a contention risk condition is detected for a certain row interval, incoming INSERT query statement transaction data can be stored to an external indexing structure for the certain row interval rather than a leaf page for the certain row interval. An index manager can store INSERT query state-ments to the external indexing structure within triggering a contention lock, and without deletion of preexisting row date wherein the INSERT query statements reference a preexisting row stored on a leaf page. On ascertaining that a contention risk condition has terminated for a certain row interval, the index manager can perform asynchronously inserting stored values of the external indexing structure to the leaf page for the certain row interval. On ascertaining that the contention risk condition has terminated for a certain row interval, the index manager can delete data from the leaf page for the certain row interval for performing the asynchronously inserting stored values of the external indexing structure to the leaf page for the certain row interval. Incoming SELECT query statements referencing data stored on the external indexing structure for a time that contention risk condition persist for a certain row interval can result in access of data from the external indexing data. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription In reference to FIG. 9 there is set forth a description of a computing environment 4100 that can include one or more computer 4101. In one example, a computing node as set forth herein can be provided in accordance with computer 4101 as set forth in FIG. 9.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
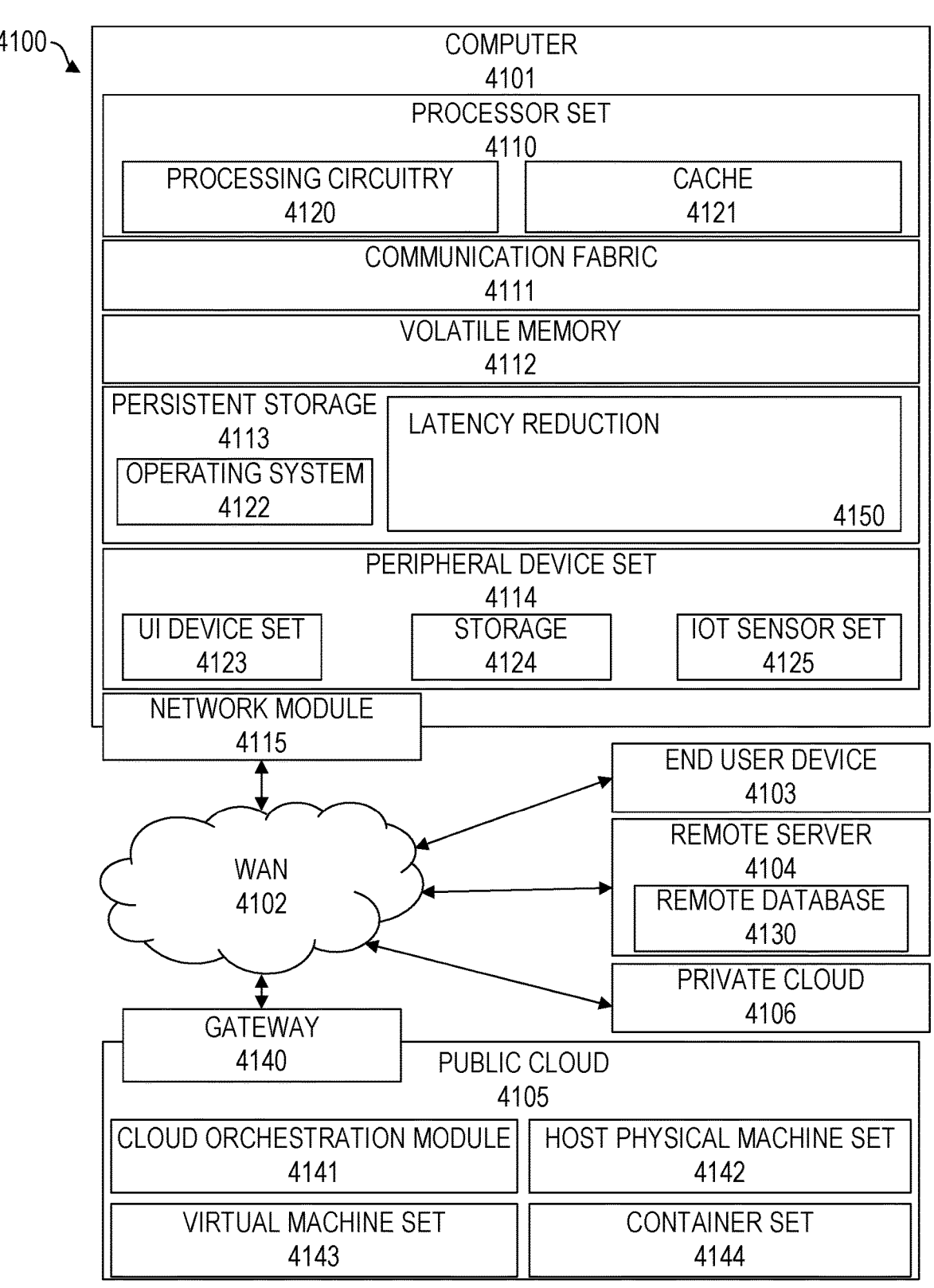
FIG. 9 depicts a computing environment according to one embodiment.

One example of a computing environment to perform, incorporate and/or use one or more aspects of the present invention is described with reference to FIG. 9. In one aspect, a computing environment 4100 contains an example of an environment for the execution of at least some of the computer code involved in performing the inventive methods, such as code 4150 for database latency reduction processing described with reference to FIGS. 1A-8. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer 4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
generating database logging data of a database, wherein the database includes a certain leaf page associated to a certain row interval;
examining logging data of the database logging data, and based on the examining the logging data, determining that a contention risk condition is present with respect to the certain row interval, wherein the determining that a contention risk condition is present for the certain row interval includes analyzing time interval data of the logging data that specifies receipt times of incoming INSERT query statements referencing the certain row interval for a history of incoming INSERT query statements, and finding from the analyzing that a time interval of incoming INSERT query statements referencing the certain row interval for a time window of interest satisfies a time interval threshold indicative of the contention risk condition for the certain row interval being present;
in response to the determining that the contention risk condition is present with respect to the certain row interval, storing incoming subsequent INSERT query statement transaction data for the certain row interval to an external indexing structure external to the certain leaf page; and
responsively to ascertaining that the contention risk condition has terminated for the certain row interval, asynchronously inserting stored transaction data values of the external indexing structure to the certain leaf page, which reduces latency and a likelihood of defining a contention with a subsequent operation, and storing further subsequent incoming INSERT query statement transaction data values to the certain leaf page.

2. A system comprising:
a memory;
at least one processor in communication with the memory; and
program instructions executable by one or more processor via the memory to perform a method comprising:

generating database logging data of a database, wherein the database includes a certain leaf page associated to a certain row interval;

examining logging data of the database logging data, and based on the examining the logging data, determining that a contention risk condition is present with respect to the certain row interval; and in response to the determining that the contention risk condition is present with respect to the certain row interval, storing incoming subsequent INSERT query statement transaction data for the certain row interval to an external indexing structure external to the certain leaf page, which reduces latency and a likelihood of defining a contention with a subsequent operation, further comprising:

during a time in which the contention risk condition persists for the certain row interval, receiving an INSERT query statement including new data for a preexisting row that is stored on the certain leaf page, and, in response to the receiving, storing the new data for the preexisting row on the external indexing structure while retaining old data for the preexisting row on the certain leaf page, wherein the new data for the preexisting row defines transaction data of the subsequent INSERT query statement transaction data, wherein the method includes responsively to ascertaining that the contention risk condition has terminated for the certain row interval, deleting the old data for the preexisting row from the certain leaf page, and storing the new data for the preexisting row to the certain leaf page.

3. The system of claim 2, wherein responsively to ascertaining that the contention risk condition has terminated for the certain row interval, asynchronously inserting stored transaction data values of the external indexing structure to the certain leaf page, and storing further subsequent incoming INSERT query statement transaction data values to the certain leaf page.

4. The system of claim 2, wherein the ascertaining that the contention risk condition has terminated for the certain row interval comprises:

examining updated logging data associated with the certain leaf page to determine that a frequency of write operations or concurrent access attempts directed to the certain row interval has fallen below a predefined contention threshold; and based on the determining, identifying that the contention risk condition has ceased to persist for the certain row interval.

5. A computer implemented method comprising:

generating database logging data of a database, wherein the database includes a certain leaf page associated to a certain row interval;

examining logging data of the database logging data, and based on analyzing time interval data of the logging data that specifies receipt times of incoming INSERT query statements referencing the certain row interval, determining that a contention risk condition is present with respect to the certain row interval; and in response to the determining that the contention risk condition is present with respect to the certain row interval, storing incoming subsequent INSERT query statement transaction data for the certain row interval to an external indexing structure external to the certain leaf page, and thereafter, responsively to ascertaining that the contention risk condition has terminated for the certain row interval, asynchronously inserting stored transaction data values of the external indexing structure to the certain leaf page, which reduces latency and a likelihood of defining a contention with a subsequent operation.

6. The computer implemented method of claim 5, further comprising: responsively to ascertaining that the contention risk condition has terminated for the certain row interval, storing further subsequent incoming INSERT query statement transaction data values to the certain leaf page.

7. The computer implemented method of claim 5, further comprising: responsively to ascertaining that the contention risk condition has terminated for the certain row interval, storing further subsequent incoming INSERT query statement transaction data values to the certain leaf page without imposing locks on the external indexing structure during the storing so that latencies associated to storing INSERT query transaction data on the external indexing structure are reduced relative to latencies associated to storing INSERT query transaction data on the certain leaf page.

8. The computer implemented method of claim 5, further comprising: responsively to ascertaining that the contention risk condition has terminated for the certain row interval, asynchronously inserting stored transaction data values of the external indexing structure to the certain leaf page.

9. The computer implemented method of claim 5, further comprising:

responsively to ascertaining that the contention risk condition has terminated for the certain row interval, asynchronously inserting stored transaction data values of the external indexing structure to the certain leaf page, performing reconfiguration of indexing data of a certain non-leaf page to specify that further subsequent incoming INSERT query statement transaction data values are to be stored to the certain leaf page, and storing the further subsequent incoming INSERT query statement transaction data values to the certain leaf page in accordance with the performing reconfiguration of the indexing data.

10. The computer implemented method of claim 5, further comprising: responsively to the determining that the contention risk condition is present for the certain row interval, reconfiguring indexing data of a non-leaf page associated to the certain leaf page to specify that the subsequent incoming query statements for the certain row interval are to be stored onto the external indexing structure.

11. The computer implemented method of claim 5, wherein the determining that the contention risk condition is present for the certain row interval includes analyzing the time interval data of the logging data that specifies the receipt times of the incoming INSERT query statements referencing the certain row interval for a history of the incoming INSERT query statements.

12. The computer implemented method of claim 5, wherein the determining that the contention risk condition is present for the certain row interval includes analyzing the time interval data of the logging data that specifies the receipt times of the incoming INSERT query statements referencing the certain row interval for a history of incoming INSERT query statements, and finding from the analyzing that a time interval of incoming INSERT query statements referencing the certain row interval for a time window of interest satisfies a time interval threshold indicative of the contention risk condition for the certain row interval being present.

13. The computer implemented method of claim 5, wherein the determining that the contention risk condition is present for the certain row interval includes analyzing the time interval data of the logging data that specifies the receipt times of the incoming INSERT query statements referencing the certain row interval, wherein the computer implemented method includes ascertaining that the contention risk condition has terminated for the certain row interval, wherein the ascertaining that the contention risk condition has terminated for the certain row interval includes analyzing further time interval data of the logging data that specifies further receipt times of incoming INSERT query statements referencing the certain row interval.

14. The computer implemented method of claim 5, wherein the determining that the contention risk condition is present for the certain row interval includes analyzing the time interval data of the logging data that specifies the receipt times of the incoming INSERT query statements referencing the certain row interval, wherein the computer implemented method includes ascertaining that the contention risk condition has terminated for the certain row interval, wherein the ascertaining that the contention risk condition has terminated for the certain row interval includes analyzing further time interval data of the logging data that specifies further receipt times of incoming INSERT query statements referencing the certain row interval, wherein the computer implemented method includes responsively to the ascertaining that the contention risk condition has terminated for the certain row interval, asynchronously inserting stored transaction data values of the external indexing structure to the certain leaf page, and storing further subsequent incoming INSERT query statement transaction data values to the certain leaf page.

15. The computer implemented method of claim 5, further comprising: during a time in which the contention risk condition persists for the certain row interval, receiving a SELECT query statement referencing data stored on the external indexing structure, and, in response to the receiving, accessing the data stored on the external indexing structure.

16. The computer implemented method of claim 5, further comprising: during a time in which the contention risk condition persists for the certain row interval, receiving an INSERT query statement including new data for a preexisting row that is stored on the certain leaf page, and, in response to the receiving, storing the new data for the preexisting row on the external indexing structure while retaining old data for the preexisting row on the certain leaf page, wherein the new data for the preexisting row defines transaction data of the subsequent INSERT query statement transaction data.

17. The computer implemented method of claim 5, further comprising: during a time in which the contention risk condition persists for the certain row interval, receiving an INSERT query statement including new data for a preexisting row that is stored on the certain leaf page, and, in response to the receiving, storing the new data for the preexisting row on the external indexing structure while retaining old data for the preexisting row on the certain leaf page, wherein the new data for the preexisting row defines transaction data of the subsequent INSERT query statement transaction data, wherein the computer implemented method includes responsively to ascertaining that the contention risk condition has terminated for the certain row interval, deleting the old data for the preexisting row from the certain leaf page, and storing the new data for the preexisting row to the certain leaf page.

18. The computer implemented method of claim 5, wherein the computer-implemented method includes responsively to ascertaining that the contention risk condition has terminated for the certain row interval, deleting old data for a preexisting row from the certain leaf page.

19. The computer implemented method of claim 5, wherein the determining that the contention risk condition is present with respect to the certain row interval comprises:

examining the logging data to identify a plurality of database transactions targeting the certain leaf page within a defined time window;

detecting, based on the logging data, that a frequency of write operations or latch acquisition attempts directed to the certain row interval exceeds a predefined threshold associated with conflict risk; and identifying that the contention risk condition persists while the frequency of access activity targeting the certain row interval remains above the threshold or until a reduction in row-level access activity is observed.

* * * * *